United States Patent
Yamazaki

(10) Patent No.: US 10,838,937 B2
(45) Date of Patent: Nov. 17, 2020

(54) DISTRIBUTED DATA MANAGEMENT APPARATUS, NON-TRANSITORY COMPUTER-READABLE STORAGE MEDIUM, AND DISTRIBUTED DATA MANAGEMENT METHOD

(71) Applicant: FUJITSU LIMITED, Kawasaki (JP)

(72) Inventor: Masanori Yamazaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 136 days.

(21) Appl. No.: 15/824,097

(22) Filed: Nov. 28, 2017

(65) Prior Publication Data

US 2018/0150489 A1 May 31, 2018

(30) Foreign Application Priority Data

Nov. 30, 2016 (JP) .................................. 2016-233416

(51) Int. Cl.
*G06F 16/22* (2019.01)
*G06F 3/06* (2006.01)
*G06F 16/23* (2019.01)

(52) U.S. Cl.
CPC ............. *G06F 16/22* (2019.01); *G06F 3/067* (2013.01); *G06F 3/0638* (2013.01); *G06F 16/2379* (2019.01)

(58) Field of Classification Search
None
See application file for complete search history.

(56) References Cited

U.S. PATENT DOCUMENTS

| | | | | |
|---|---|---|---|---|
| 8,775,627 | B2* | 7/2014 | Lee ......................... | H04L 47/70 709/226 |
| 9,940,270 | B2* | 4/2018 | Morales .............. | G06F 13/1642 |
| 10,114,837 | B2* | 10/2018 | Larson .................. | G06F 16/275 |
| 10,169,088 | B2* | 1/2019 | Tsirkin .................. | G06F 9/5016 |
| 10,171,314 | B2* | 1/2019 | Raghavan ........... | H04L 41/5029 |
| 10,250,652 | B2* | 4/2019 | Morita ................... | G06F 13/00 |
| 10,325,161 | B2* | 6/2019 | Matsumoto ........ | G06K 9/00362 |

(Continued)

FOREIGN PATENT DOCUMENTS

| | | |
|---|---|---|
| JP | 8-339323 | 12/1996 |
| JP | 2001-168921 | 6/2001 |

(Continued)

*Primary Examiner* — Kim T Nguyen
(74) *Attorney, Agent, or Firm* — Xsensus LLP

(57) ABSTRACT

A distributed data management method executed by a distributed data management apparatus, the method including, receiving an acquisition request for device information regarding a device, receiving a notification regarding index information of the device information, counting a first number of times, the first number of times being a number of times when the acquisition request is received within a predetermined period, counting a second number of times, the second number of times being a number of times when the notification is received within the predetermined period, determining whether the received index information is to be stored into a first memory region or into a second memory region based on the first number of times and the second number of times, and storing the index information corresponding to the received notification into the first memory region or the second memory region based on a result of the determining.

6 Claims, 22 Drawing Sheets

(56) References Cited

U.S. PATENT DOCUMENTS

| | | | |
|---|---|---|---|
| 10,325,310 B2 * | 6/2019 | Gong | G06Q 30/0635 |
| 2006/0161645 A1 | 7/2006 | Moriwaki et al. | |

FOREIGN PATENT DOCUMENTS

| JP | 2006-195788 | 7/2006 |
|---|---|---|
| JP | 2011-118950 | 6/2011 |
| JP | 2011-198189 | 10/2011 |

* cited by examiner

FIG. 2

| GW ID | INDEX | GW ADDRESS | UPDATE TIME PERIOD |
|---|---|---|---|
| GW1 | [<br>{ID ⇒ Dev-A, body ⇒AIR TEMPERATURE},<br>{ID ⇒ Camera-B, body ⇒ Web-camera},<br>] | GW1_addr | 2016-05-30 11:35:00 |
| GW 2 | ... | ... | ... |
| ... | ... | ... | ... |

FIG. 5

| DEVICE ID (6a) | RAW DATA (body) (6b) | TIMESTAMP (6c) |
|---|---|---|
| Dev-A | AIR TEMPERATURE ⇒ 20℃ | 2016-05-30 11:29:00 |
| Camera-B | Web-Camera ⇒ http:// | ... |
| Dev-A | AIR TEMPERATURE ⇒ 21℃ | 2016-05-30 11:30:00 |
| ... | ... | ... |

| INDEX | INDEX GW | TTL | UPDATE TIME PERIOD |
|---|---|---|---|
| {ID ⇒ Dev-A, body ⇒AIR TEMPERATURE} | GW1 | 180 | 2016-05-30 11:40:00 |
| ... | ... | ... | ... |

FIG. 17

| INDEX | $N_{put}$ | $N_{req}$ | SINK ADDRESS | TTL | UPDATE TIME PERIOD |
|---|---|---|---|---|---|
| {ID ⇒ Dev-C, body ⇒AIR TEMPERATURE} | 12 | 30 | sink2_addr | 120 | 2016-05-30 11:55:00 |
| ... | ... | ... | ... | ... | ... |

DISTRIBUTED DATA MANAGEMENT APPARATUS, NON-TRANSITORY COMPUTER-READABLE STORAGE MEDIUM, AND DISTRIBUTED DATA MANAGEMENT METHOD

CROSS-REFERENCE TO RELATED APPLICATION

This application is based upon and claims the benefit of priority of the prior Japanese Patent Application No. 2016-233416, filed on Nov. 30, 2016, the entire contents of which are incorporated herein by reference.

FIELD

The present technology relates to a distributed data management apparatus, a non-transitory computer-readable storage medium, and a distributed data management method.

BACKGROUND

In the Internet of things (IoT), in addition to personal computers (PCs), servers, and smart devices, various "things" are coupled to the Internet. Therefore, for example, there is a technology which utilizes information from a great number of devices coupled to the Internet (for example, refer to Patent Documents 1 and 2).

For example, there is a method in which, as depicted in FIG. 1, data acquired from a great number of devices such as measuring instruments 3a and smartphones 3b (such data are hereinafter referred to "device data") are managed collectively by a data center 10 coupled to the Internet 40. In contrast, if device data are stored not by the data center 10 but in a distributed manner by repeaters such as gateways 20 (each hereinafter referred to as "GW 20") or edge servers in the proximity (on network edges) of devices users have, the communication delay or the network traffic may be reduced. Further, if processes that have been performed by the data center 10 are performed by the GWs 20, the load upon the data center 10 may be reduced and the processing capacity of the entire system may be enhanced.

CITATION LIST

Patent Documents

[Patent Document 1] Japanese Laid-open Patent Publication No. 2006-195788
[Patent Document 2] Japanese Laid-open Patent Publication No. 2011-118950
[Patent Document 3] Japanese Laid-open Patent Publication No. 8-339323
[Patent Document 4] Japanese Laid-open Patent Publication No. 2011-198189
[Patent Document 5] Japanese Laid-open Patent Publication No. 2001-168921

SUMMARY

According to an aspect of the embodiments, a distributed data management apparatus including a memory including a first memory region and a second memory region and a processor coupled to the memory, and the processor configured to execute a process, the process including acquiring device information regarding a device, transmitting index information corresponding to the device information to one or more different apparatuses located within a predetermined distance from the distributed data management apparatus, receiving an acquisition request for the device information, receiving a notification regarding the index information, the notification being received from one of the one or more different apparatuses when the device information corresponding to the index information is acquired on the one of the one or more different apparatuses, counting a first number of times, the first number of times being a number of times when the acquisition request is received within a predetermined period, counting a second number of times, the second number of times being a number of times when the notification is received within the predetermined period, determining whether the received index information is to be stored into the first memory region or into the second memory region based on the first number of times and the second number of times, the index information including a storage position of the device information when the index information is stored into the first memory region, the index information including an identifier indicating a transmission source of the notification when the index information is stored into the second memory region, storing the index information corresponding to the received notification into the first memory region or the second memory region based on a result of the determining, and transmitting the device information corresponding to the acquisition request or the storage position when the acquisition request for the device information is received.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a view depicting an example of a directory database (DB) according to one embodiment;
FIG. 5 is a view depicting an example of a raw data DB according to one embodiment.

FIG. 17 is a view depicting an example of a third cache table according to the second embodiment;

DESCRIPTION OF EMBODIMENTS

Figure 1:
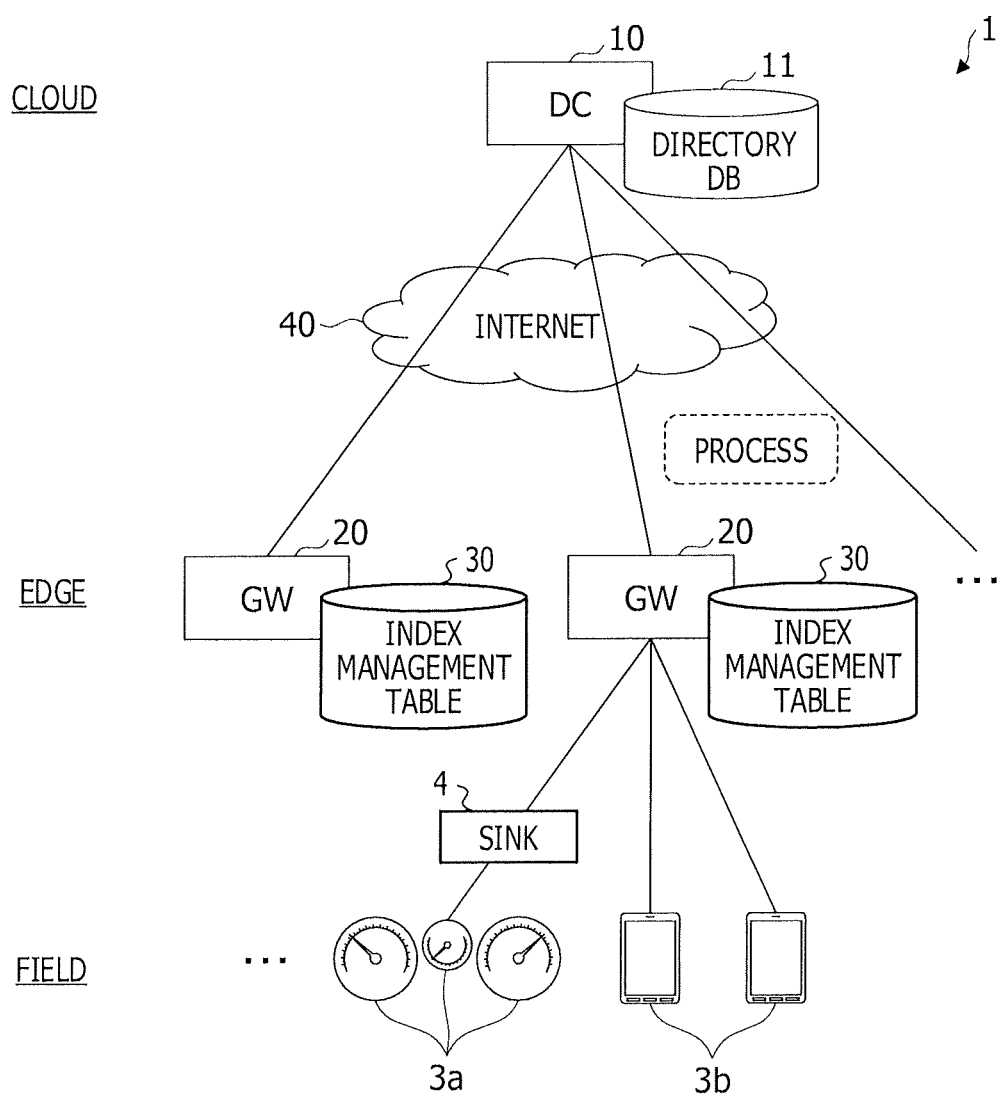
FIG. 1 is a view depicting an example of an entire configuration of a distributed data management system according to one embodiment.

However, in the system described above, a GW 20 that accepts an acquisition request for device data inquires, when the device data to be acquired is not stored in a data storage region managed by itself, the data center 10 about the location of the device data. The data center 10 refers to a directory DB 11 to specify the GW 20 in which device data for which the acquisition request has been issued is stored, and transfers the device data from the specified GW 20 to the GW 20 that has accepted the acquisition request for the device data. In this manner, about device data that is not retained by the GW 20 that has accepted the acquisition request for the device data, inquiry to the data center 10 or data transfer between the GWs 20 occurs.

For example, in comparison with a case in which the device is fixed, when the device moves, device data sent from the same device is likely to be stored into a plurality of GWs 20 different from each other in accordance with the movement of the device. In such a case as just described, management regarding at which one of storage locations over a wide area the device data of an acquisition request target is stored is complicated further. Therefore, a period of time for acquisition of the device data increases and the load upon the network increases.

In contrast, it may seem recommendable to issue a notification of device data stored in neighboring GWs 20 such that the same device data are retained by the neighboring GWs 20. However, it is very difficult and impractical to store the same device data by all of the neighboring GWs 20 if it is taken into consideration that the data amount becomes enormous.

Therefore, according to an aspect of the present technology, it is an object to quickly cope with a data acquisition request with a limited storage capacity.

In the following, embodiments of the present technology is described with reference to the accompanying drawings. It is to be noted that, in the present specification and the drawings, components having substantially the same functional configurations are denoted by the same reference characters and overlapping description of them is omitted herein.

[Entire Configuration of Distributed Data Management System]

First, an example of a configuration of a distributed data management system 1 according to an embodiment of the present technology is described with reference to FIG. 1.

FIG. 1 depicts an example of a configuration of the distributed data management system 1 according to the present embodiment. The distributed data management system 1 according to the present embodiment stores device data acquired from a great number of devices (collectively referred to as "device 3") such as measuring instruments 3a or smartphones 3b into storage regions under the control of each GW 20. The devices 3 include the instruments 3a and the smartphones 3b and besides any sensor coupled to the Internet 40 such as environment sensors such as temperature sensors or humidity sensors, beacon transmitters, vehicles, and consumer electronics. Further, fixed devices 3 and besides mobile devices 3 are included in the devices 3. Therefore, storage locations of device data acquired from the devices 3 are distributed over a wide area of a field. As an example of the device data, various kinds of data obtained from various sensors such as a temperature, a humidity, a luminance, a position, a time period, and a function are available.

A device 3 is coupled to a GW 20 by wireless fidelity (Wi-Fi) direct (registered trademark) or Bluetooth (registered trademark) low energy (BLE). The GW 20 acquires and stores device data from devices 3 distributed over a wide area. In this manner, in the present embodiment, device data are stored in a distributed manner in a plurality of distributed data management apparatus such as GWs 20, edge servers, Wi-Fi (registered trademark) access points (APs), or base stations of a mobile network. In the following description, a GW 20 is taken as an example of a distributed data management apparatus. Further, when one of a plurality of GWs 20 serves as a distributed data management apparatus, GWs 20 existing within a given distance serve as repeaters. For example, all of the GWs 20 may possibly serve as the distributed data management apparatus. Further, where a GW 20 exists within the given distance from the distributed data management apparatus, it may possibly serve as a repeater.

If a GW 20 has a sufficient storage region, devices 3 may be configured so as to be directly coupled to the GW 20. Alternatively, devices 3 may be configured such that they are coupled to a GW 20 through a sink 4 as in the present embodiment such that the sink 4 receives device data from the devices 3 and stores the device data into a given DB. An address of a sink node (hereinafter referred to as "sink address") indicates a storage location of device data (raw data) managed by the sink 4. A plurality of sinks 4 may be coupled to one GW 20. The sink 4 is managed by one of GWs 20. Each device 3 may move between a plurality of sinks 4 and between a plurality of GWs 20.

Each GW 20 is coupled to a data center (DC) 10 through the Internet 40. The function of the data center 10 may be implemented by a computer on the cloud coupled to the Internet 40.

In the present embodiment, processes having been performed by the data center 10 or a computer on the cloud are performed by a GW 20 in the neighborhood (at an edge) of a user. Further, processes having been performed at the terminal side such as a device 3 are performed by a GW 20. A process deployed in a GW 20 is executed when a request of an end user is issued or when device data is acquired cyclically. At this time, information of a storage location of the device data is used. Index information stored in an index management table 30 retained by each GW 20 is used to manage the storage location of the device data and search for the device data to be used for the process.

The data center 10 intensively collects and retains index information into a directory DB 11. The directory DB 11 is used to determine a deployment destination of a process. FIG. 2 depicts an example of a directory DB according to the present embodiment. The directory DB illustrated in FIG. 2 may be the directory DB 11 illustrated in FIG. 1. A GW identification (ID) 11a, an index 11b, a GW address 11c, and an update time period 11d are stored in the directory DB 11. The data center 10 may search the index 11b and the GW address 11c of the directory DB 11 to specify by which GW used device data is managed.

[Functional Configuration]

Figure 3:
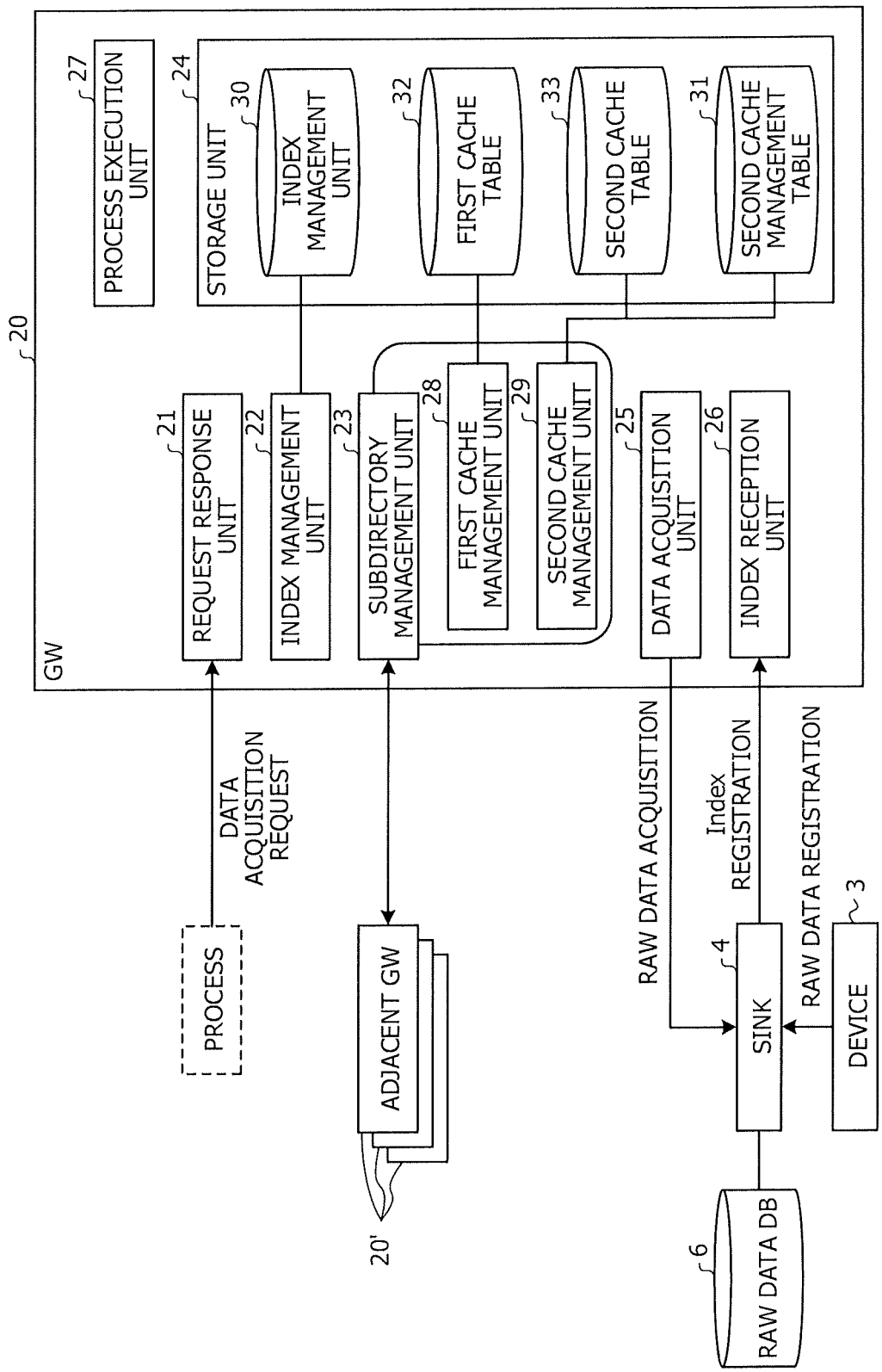
FIG. 3 is a view depicting an example of a functional configuration of a GW according to one embodiment.

Now, an example of a functional configuration of the GW 20 according to the present embodiment is described with reference to FIG. 3. FIG. 3 depicts an example of a functional configuration of the GW 20 according to the present embodiment. The GW 20 according to the present embodiment includes a request response unit 21, an index management unit 22, a subdirectory management unit 23, a storage unit 24, a data acquisition unit 25, an index reception unit 26, and a process execution unit 27.

In response to a data acquisition request from a deployed process, the request response unit 21 sends back device data requested for acquisition. The index management unit 22 manages the index management table 30.

Figure 4:
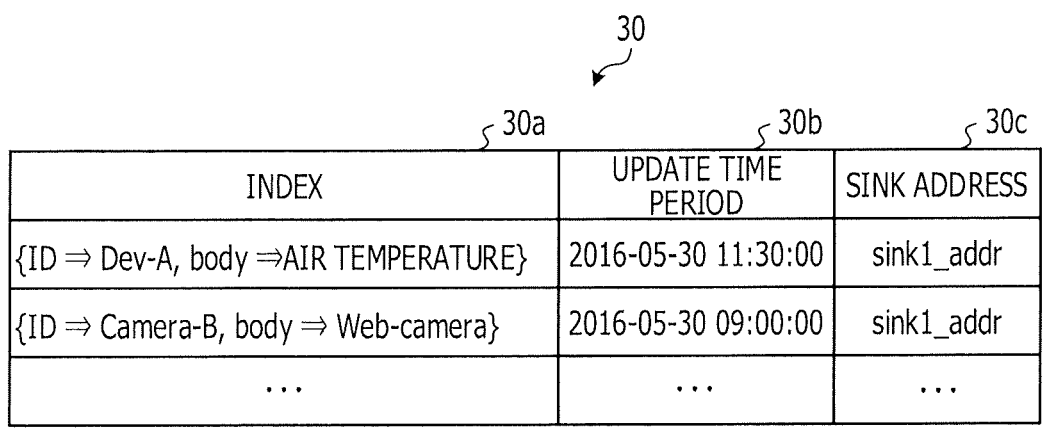
FIG. 4 is a view depicting an example of an index management table according to a first embodiment.

FIG. 4 depicts an example of an index management table according to the present embodiment. The index management table illustrated in FIG. 4 may be the index management table 30 illustrated in FIG. 3. The index management table 30 stores an index 30a, an update time period 30b, and a sink address 30c. The sink address 30c is an example of a storage location of device data corresponding to the index 30a.

In the present embodiment, the device data is stored in a raw data DB 6, and index information and a storage location of the index information are stored in the index management table 30. In order to know in which sink 4 desired device data is stored, it is desired for the index management table 30 to store the sink address 30c corresponding to the index 30a of the demanded device data.

FIG. 5 depicts an example of a raw data DB according to one embodiment. The raw data DB illustrated in FIG. 5 may be the raw data DB 6 illustrated in FIG. 3. The raw data DB 6 stores a device ID 6a, actual data (raw data, body) 6b acquired from a device 3, and a timestamp 6c therein.

For example, where the index 30a stored at the first row of the index management table 30 is {ID⇒Dev-A, body⇒air temperature} as depicted in FIG. 4, actual data corresponding to the index in the example of the raw data 6B of FIG. 5 is raw data 6b "air temperature⇒20° C." and "air temperature⇒21° C." on the first and third lines corresponding to [Dev-A] of the device ID 6a.

Referring back to FIG. 3, the subdirectory management unit 23 includes a first cache management unit 28 and a second cache management unit 29 and manages a plurality of cache tables and a plurality of subdirectories. The index management table 30, a second cache management table 31, a first cache table 32, and a second cache table 33 are stored in the storage unit 24. The second cache management table 31, the first cache table 32, and the second cache table 33 are an example of subdirectories that manage information for allowing acquisition of data or a data storage location managed by a GW 20 different from the own GW 20. Here, a GW 20 different from the own GW 20 is a repeater located within a given distance from the own GW 20 and, in the present embodiment, is referred to as "adjacent GW 20'."

The first cache management unit 28 of the subdirectory management unit 23 manages the first cache table 32. The second cache management unit 29 manages the second cache management table 31 and the second cache table 33.

Figure 6:
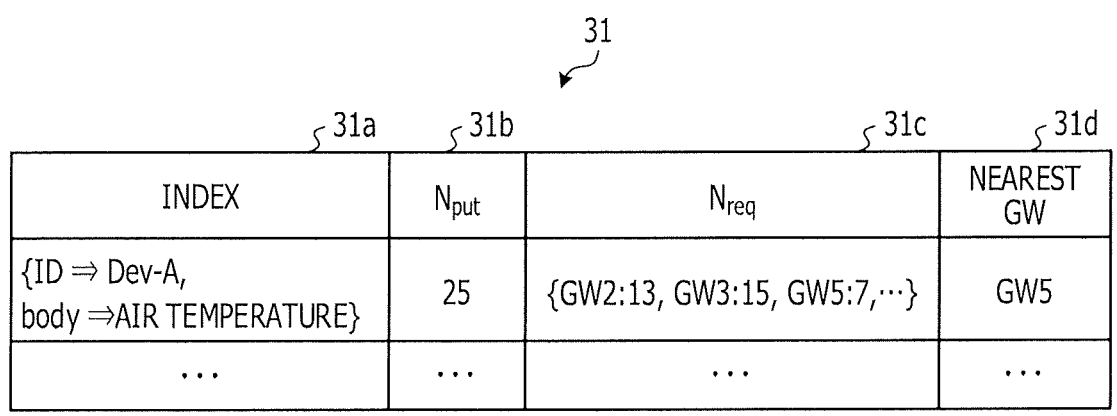
FIG. 6 is a view depicting an example of a second cache management table according to one embodiment.

FIG. 6 depicts an example of a second cache management table according to one embodiment. The second cache management table illustrated in FIG. 6 may be the second cache management table 31 illustrated in FIG. 3. When a notification that the second cache table 33 is updated (notification of subdirectory updating) is issued from the GW 20 to an adjacent GW 20', information (index information) relating to device data retained in the second cache table 33 is registered as an entry into the second cache management table 31 of the adjacent GW 20'.

For example, the information registered as an entry in the second cache management table 31 is index information retained in the second cache table 33 in the adjacent GW 20'. Therefore, it is recognized that, since the index information stored in the second cache management table 31 is retained in the second cache table 33, the first cache table need not be updated.

The second cache management table 31 stores an index 31a, a data registration request number Nput 31b, a data acquisition request number Nreq 31c, and a nearest GW 31d therein. The data registration request number Nput 31b counts the number of times by which a registration request into the second cache table 33 is issued. The data acquisition request number Nreq 31c counts, for each GW, the number of times by which a data acquisition request is issued from the adjacent GWs 20' to the second cache table 33. The nearest GW 31d stores a GW having the shortest distance from the own GW 20.

Referring back to FIG. 3, the data acquisition unit 25 acquires device data from the raw data DB 6 that is retained by the sink 4 and is an actual data storage location in response to a data acquisition request.

The index reception unit 26 receives index registration of device data stored in the raw data DB 6 from the sink 4. The process execution unit 27 executes a process deployed thereto. As an example of the deployed process, a process for acquiring picked up image data (example of device data) of the device 3 that is a camera in a system that performs a monitoring service, another process for performing analysis using the acquired device data and so forth are available.

[Across-GW Index Search]

The subdirectory management unit 23 performs a search for index information, which is other than index information managed by the own GW 20, for acquiring device data from a data storage location managed by a different GW 20 using the information stored in the index management table 30 and the information of the subdirectory (such search for index information is hereinafter referred to as "across-GW index search"). The information of the subdirectory includes information stored in the first cache table 32 and the second cache table 33.

Figure 7:
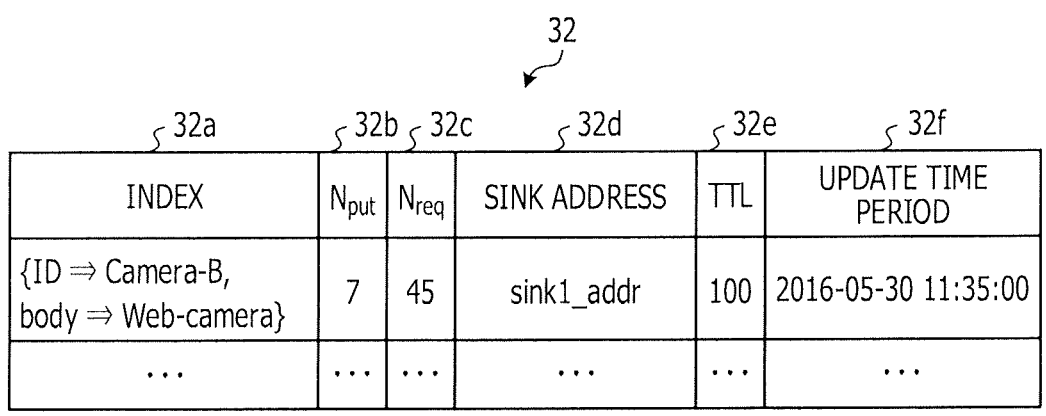
FIG. 7 is a view depicting an example of a first cache table according to one embodiment.

FIG. 7 depicts an example of a first cache table according to the present embodiment. The first cache table illustrated in FIG. 7 may be the first cache table 32 illustrated in FIG. 3. In response to an update request for the subdirectory to be performed for an adjacent GW 20' located within a given distance from the GW 20, the first cache table 32 managed by the adjacent GW 20' is updated. The first cache table 32 is an example of a first storage unit that stores index information to information of apparatus and storage location information of the apparatus information.

The first cache table 32 stores an index 32a, a data registration request number Nput 32b, a data acquisition request number Nreq 32c, a sink address 32d, a time to live (TTL) 32e, and an update time period 32f therein. In the first cache table 32, if the index 32*a* is searched, the sink address 32*d* that is not under the control of the own GW 20 but retains target device data, for example, a storage location of the target device data, may be specified.

The TTL 32*e* indicates expiration time of the index 32*a* stored in the first cache table 32. For example, if the value of the TTL 32*e* becomes "0," it is decided that the corresponding index 32*a* has expired and the index 32*a* is deleted from the first cache table 32. Consequently, undesired index information in the subdirectory may be deleted and it may be suppressed that the data amount managed at the GW 20 side increases.

Further, when an across-GW index search is to be performed, incrementing of the TTL 32 corresponding to the index information is executed. Consequently, device data for which the number of data acquisition requests is great and with high popularity is less likely to expire, or for example, such device data is less likely to be deleted from the first cache table 32. Further, if the process is deployed to the GW 20 again, the GW expires automatically and the device data is deleted from the first cache table 32.

Figure 8:
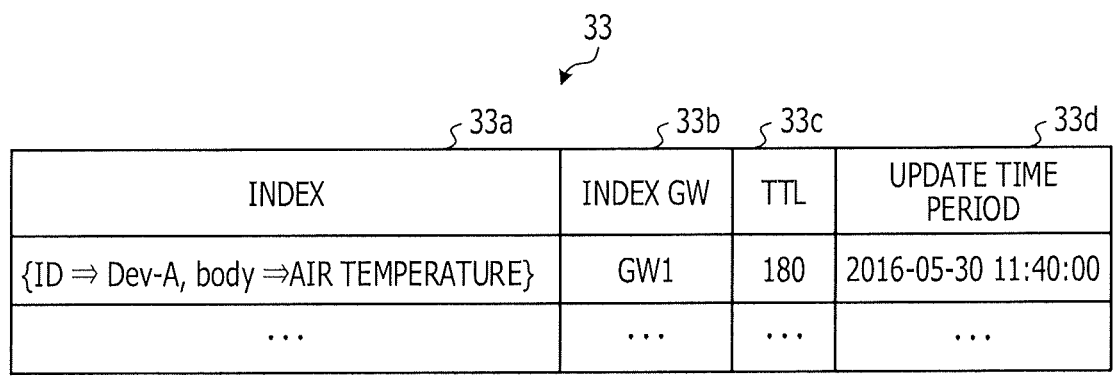
FIG. 8 is a view depicting an example of a second cache table according to one embodiment.

FIG. 8 depicts an example of a second cache table according to the present embodiment. The second cache table illustrated in FIG. 8 may be the second cache table 33 illustrated in FIG. 3. The second cache table 33 managed by the adjacent GWs 20' is updated when the data registration request number becomes greater than the data acquisition request number in response to an update request (registration request) for the subdirectory to be performed for the adjacent GWs 20' within the given distance from the GW 20. The second cache table 33 is an example of a second storage unit that stores index information of device data and information of a repeater (adjacent GW 20') of the transmission source of the device data therein.

The second cache table 33 stores an index 33*a*, an index GW 33*b*, a TTL 33*c*, and an update time period 33*d*. In the second cache table 33, if the indexes 33*a* are searched and a demanded index 33*a* is found, the GW 20 that manages index information for which an acquisition request is issued is found by the index GW 33*b* corresponding to the found index. Therefore, the sink address 32*d* indicative of the storage location of the device data is obtained by performing a search for the index information again in the first cache table 32 managed by the GW 20. It is to be noted that the TTL 33*c* indicates expiration time of the index 33*a* stored in the second cache table 33.

The index management table 30 retains only storage locations of device data indicated by the index 30*a* managed by the GW 20 of itself. Therefore, where the GW 20 does not manage information of the subdirectory as in the present embodiment, an inquiry about a directory to the data center 10 is made every time. As a result, the traffic volume with the data center 10 increases, and the response time period degrades. Therefore, in the present embodiment, the subdirectory management unit 23 manages information of the subdirectory to make it possible to acquire a storage location of device data stored in the adjacent GWs 20' without inquiring the data center 10.

It is to be noted that, as a presupposition, the GW 20 and the sink 4 are installed fixedly and do not move. In contrast, the device 3 moves. Therefore, the distance between the GW 20 and the device 3 and the distance between the sink 4 and the device 3 vary dynamically. Accordingly, device data to be acquired from one device 3 may transit from device data managed by one GW 20 to device data managed by an adjacent GW 20'. For example, when the device 3 moves largely, the possibility that an across-GW index search of device data to be acquired for performing the deployed process is performed is higher.

A deployed process is sometimes deployed to device data of a GW 20 other than the device data managed by the GW 20 of the process itself in order to distribute the load. Alternatively, it is sometimes desired to acquire, because the device 3 itself moves out of management by the GW 20, in which the process has been deployed, into management by a different adjacent GW 20', device data in the GW 20 in which the process has been deployed.

In this case, the GW 20 according to the present embodiment refers to the first cache table 32 and the second cache table 33 to perform an across-GW index search. At this time, in the present embodiment, the collection range of index information to a subdirectory is restricted to adjacent GWs 20' located within the given distance from the own GW 20 to prevent the increase of the traffic by subdirectory management performed by each GW 20. The reason is that, since it is supposed that the device 3 continuously moves within the management area of the GW 20, when index information is registered into the own GW 20, if a notification of this is issued to the adjacent GWs 20', either the sink address of the data storage location of the GW 20 is stored into the first cache table 32 of the adjacent GWs 20' or the GW 20 of the transmission source (notification source) is stored into the second cache table 33 of the adjacent GWs 20'. Consequently, when an across-GW index search occurs, the storage location of device data whose acquisition request is received may be specified using the first cache table 32 and the second cache table 33.

However, also when an across-GW index search occurs, communication occurs between GWs 20. For example, the traffic volume by messages for subdirectory management performed by each GW 20 and the response time period to a data acquisition request have a tradeoff relationship to each other.

Therefore, in the present embodiment, the storage area for information to be used for subdirectory management performed by each GW 20 has a two-data structure of the first cache table 32 and the second cache table 33. Thus, information is stored into the first cache table 32 or the second cache table 33 in response to the frequencies of the data acquisition request and the data registration request.

In the first cache table 32, the address of a sink 4 that retains device data of a data acquisition request target is managed. The first cache table 32 is updated upon every registration of index information into the index management table 30. Therefore, the latest sink address may be obtained by referring to the first cache table 32.

In the second cache table 33, the address of a GW 20 that retains index information of device data of a data acquisition request target is managed. The second cache table 33 is updated only at the first time and when the threshold value varies and is not updated upon every registration of index information into the index management table 30.

For example, what is managed in the first cache table 32 is detailed index information, and what is managed in the second cache table 33 is index information that is rough in comparison with the first cache table 32.

Therefore, when the first cache table 32 is used for search of data whose acquisition request is issued, the search locations decrease, for example, like search of the index management table 30 of the own GW 20→search of the subdirectory→access to the device data. Therefore, the first cache table 32 is advantageous where the number of data acquisition requests is great. On the other hand, where the number of data registration request is great, this is disadvantageous in comparison with an alternative case in which rough index information is collected using the second cache table 33. For example, if detailed index information is collected using the first cache table 32, although the traffic volume is great, the response time period is short where the number of data acquisition requests is great.

In contrast, where the second cache table 33 is used for search of data whose acquisition request is issued, the number of search locations is greater, for example, like search of the index management table 30 of the own GW 20→search of the subdirectory→search of an adjacent GW 20'→access to device data. Therefore, the second cache table 33 is disadvantageous where the number of data acquisition requests is great. For example, if rough index information is collected using the second cache table 33, although the traffic volume is small, the response time period is long where the number of data acquisition requests is great.

Therefore, when the number of data acquisition requests is greater than the number of data registration requests, it is preferable to use detailed index information managed in the first cache table 32. On the other hand, when the number of data registration requests is greater than the number of data acquisition requests, it is preferable to use rough index information managed in the second cache table 33. Consequently, a data acquisition request may be coped with rapidly with a restricted storage capacity taking the balance between the traffic volume by messages for subdirectory management performed by the GW 20 and the response time period to a data acquisition request into consideration.

In order to execute the foregoing processes, in the present embodiment, a data registration request number Nput is stored as an index indicative of a data registration request frequency. Further, as an index indicative of a data acquisition request frequency, a data acquisition request number Nreq is stored.

Then, when αNput−βNreq≤0, for example, when the data acquisition request frequency is equal to or higher than the data registration request frequency, the first cache table 32 is updated upon registration of data. On the other hand, upon data acquisition, the data acquisition unit 25 acquires device data directly from the storage location indicated by the sink address 32d stored in the first cache table 32.

On the other hand, when αNput−βNreq≥0, for example, when the data registration request frequency is higher than the data acquisition request frequency, the second cache table 33 is updated upon registration of data. Further, upon data acquisition, the data acquisition unit 25 searches for the GW 20 indicated by the index GW 33b stored in the second cache table 33 to acquire device data.

However, even when αNput−βNreq>0, upon registration of data only into the nearest GW, the first cache table 32 is updated. This is hereinafter described.

α and β are weighting values for normalizing the data registration request number Nput and the data acquisition request number Nreq for comparing them with each other and are set to values according to message sizes upon data acquisition and data registration.

It is to be noted that the data acquisition request number Nreq is an example of a first counter for storing the number of times of the acquisition request for each piece of index information when a data acquisition request is received. Also, the data registration request number Nput is an example of a second counter for storing the number of times of notification when the notification is received from the adjacent GW 20'.

[Adjacent GW/Nearest GW]

Figure 9:
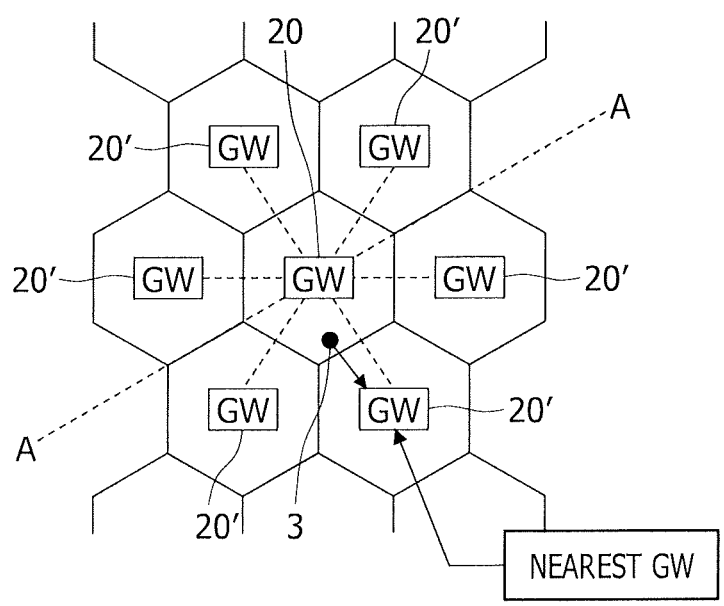
FIG. 9 is a view illustrating adjacent GWs and a nearest GW according to one embodiment.

Assuming that respective GWs 20 have areas that do not overlap with each other as depicted in FIG. 9, in the present embodiment, a GW having an area adjacent a GW 20 is defined as "adjacent GW 20'." Although, in the example of FIG. 9, six adjacent GWs 20' exist around the GW 20, the adjacent GWs are not limited to them. The adjacent GWs 20' are an example of GWs positioned within a given distance from the GW 20. If a GW is positioned within the given distance from the GW 20, even if the GW does not have an area adjacent the GW 20, the GW may possibly become an adjacent GW 20'.

The nearest GW is one of the adjacent GWs 20', which has the smallest distance from the position of the device 3. If it is assumed that a data acquisition request has some geographical locality, it is estimated that the possibility that a data acquisition request may be received from within the area of the nearest GW from among the adjacent GWs 20' is higher than that from the other adjacent GWs 20'.

Therefore, even when αNput−βNreq>0, the first cache table 32 is updated only for the nearest GW. Consequently, if it is assumed that the device 3 continuously moves in the GW area, registration of data and efficient acquisition of data may be performed following up the movement of the device 3, and suppression of divergence of the traffic volume may be anticipated. Further, although, immediately after the movement, the data registration request number Nput is great and αNput−βNreq>0 is satisfied, the data acquisition request number Nreq gradually increases, and at a certain point of time, αNput−βNreq≤0 is satisfied. At this time, by preparing the first cache table 32, a sudden increase of the response time period may be suppressed.

It is to be noted that the nearest GW is not limited to the GW positioned nearest to the device 3 and besides, may be, for example, a plurality of GWs located at the device 3 side with respect to the GW 20 at the center. In FIG. 9, the three adjacent GWs 20' located at the device 3 side with respect to a line A-A around the GW 20 may be determined as nearest GWs. Further, from among the adjacent GWs 20', the GW whose distance from the position of the device 3 is shortest and the GWs positioned nearest to the GW on the opposite sides of the GW may be determined as nearest GWs.

First Embodiment

[Distributed Data Management Process]

Figure 10:
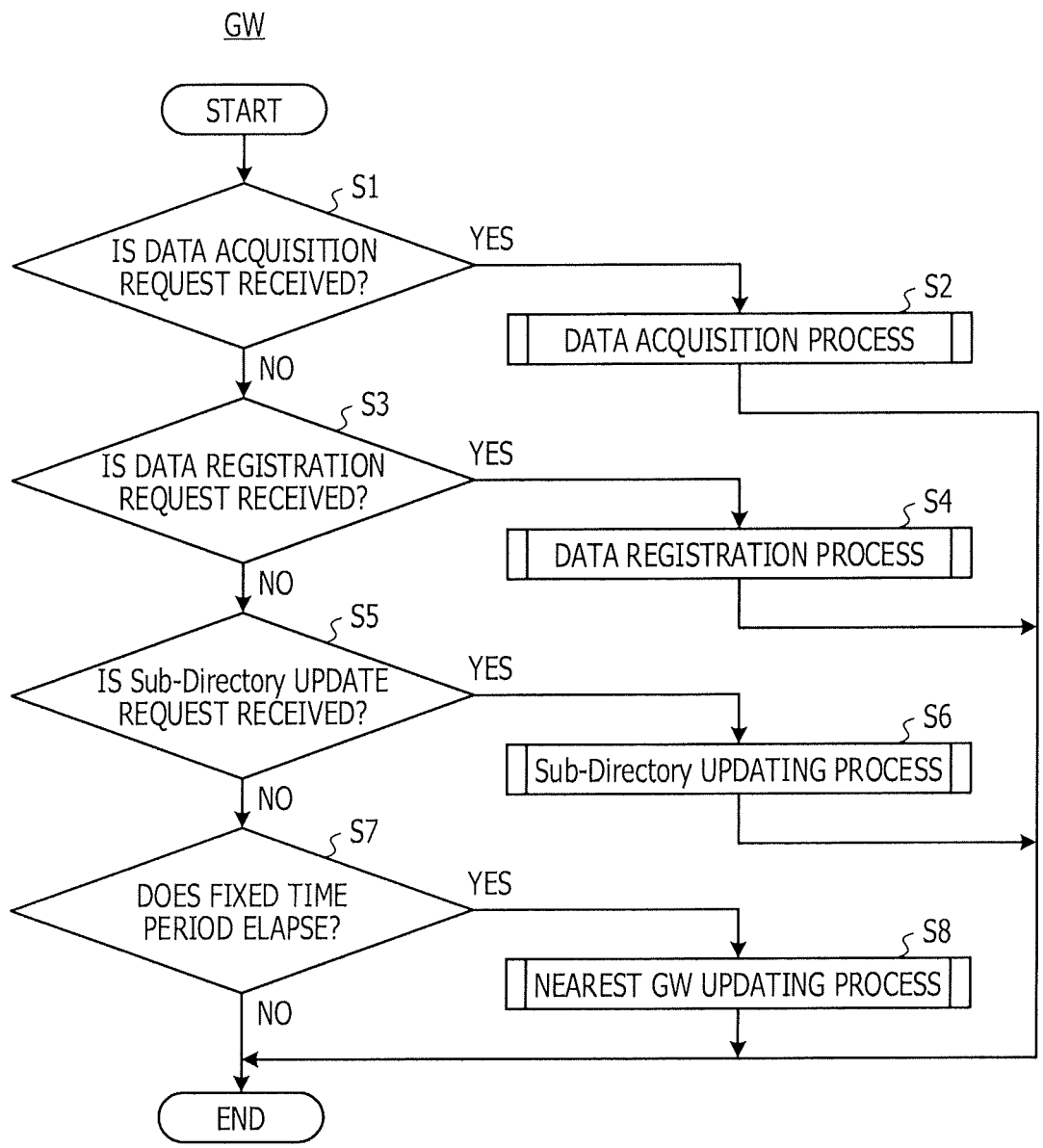
FIG. 10 is a flow chart illustrating an example of a distributed data management process according to one embodiment.

Now, an example of a distributed data management process according to a first embodiment is described with reference to FIG. 10. FIG. 10 is a flow chart illustrating an example of a distributed data management process according to the present embodiment. The process depicted in FIG. 10 is executed by all of the GWs 20 in the distributed data management system 1.

First, the request response unit 21 decides whether a data acquisition request is received (step S1). If the request response unit 21 decides that a data acquisition request is received, it executes a data acquisition process of FIG. 11 (step S2) and then ends the present process.

If the request response unit 21 decides that a data acquisition request is not received, the data acquisition unit 25 decides whether a data registration request is received (step S3). If the data acquisition unit 25 decides that a data registration request is received, it executes a data registration process of FIG. 12 (step S4) and then ends the present process.

If the data acquisition unit 25 decides that a data registration request is not received, the subdirectory management unit 23 decides whether a subdirectory update request is received (step S5). If the subdirectory management unit 23 decides that a subdirectory update request is received, it executes a subdirectory updating process of FIG. 13 (step S6) and then ends the present process.

Figure 14:
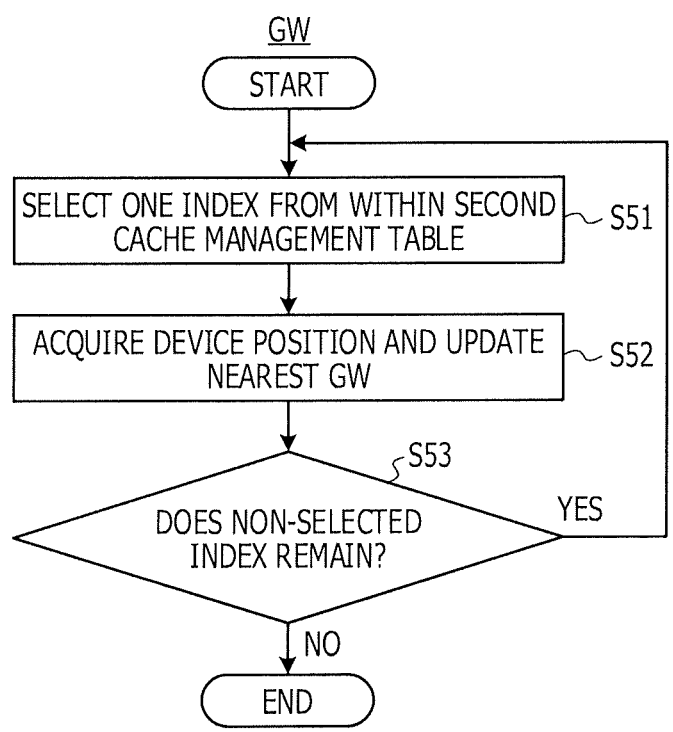
FIG. 14 is a flow chart illustrating an example of a nearest GW updating process according to one embodiment.

If the subdirectory management unit 23 decides that a subdirectory update request is not received, if a fixed period of time elapses (step S7), the subdirectory management unit 23 executes a nearest GW updating process of FIG. 14 (step S8) and then ends the present process. On the other hand, if the fixed period of time does not elapse, the present process is ended immediately.

[Data Acquisition Process]

Figure 11:
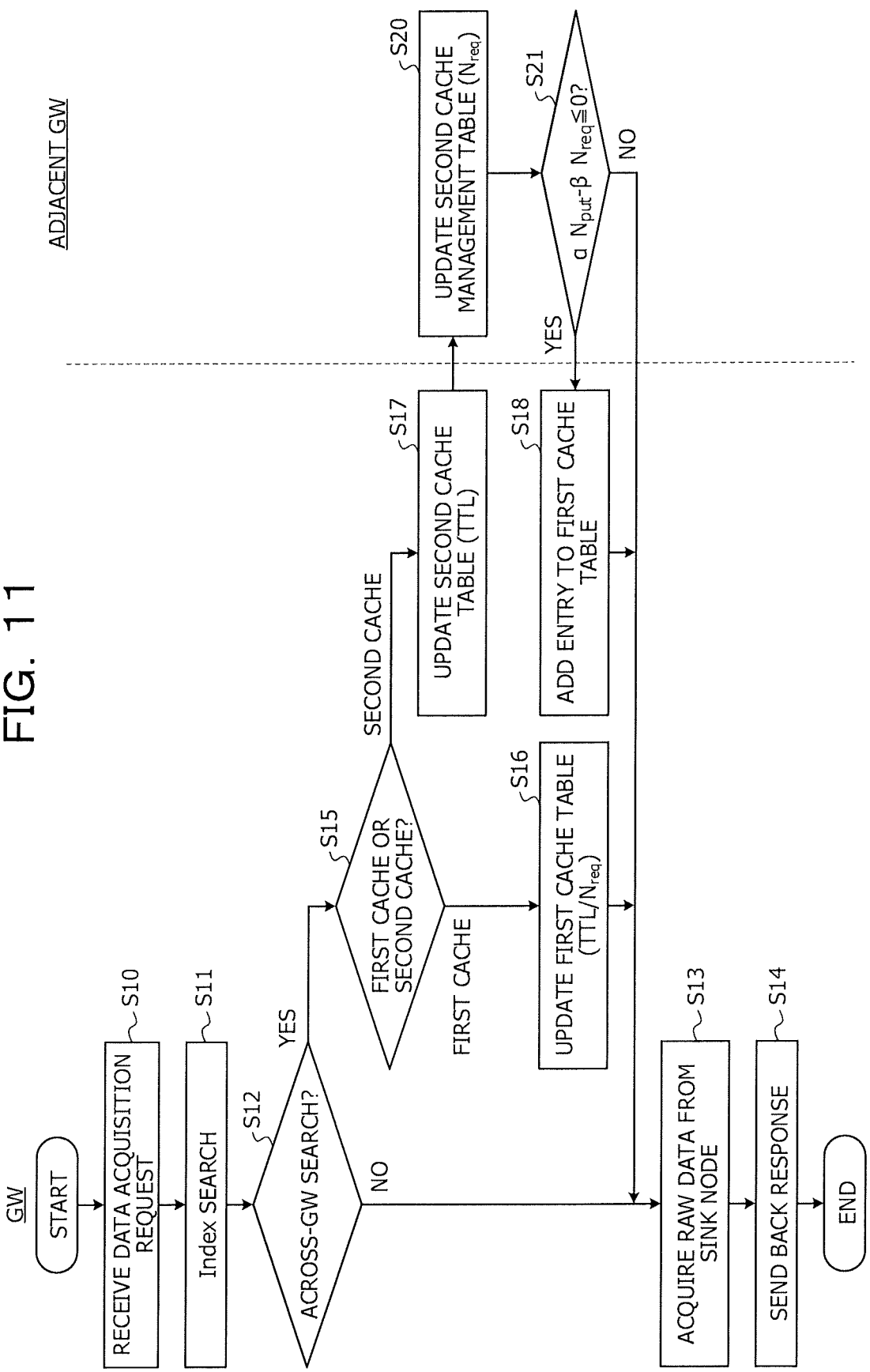
FIG. 11 is a flow chart illustrating an example of a data acquisition process according to the first embodiment.

Now, an example of the data acquisition process according to the first embodiment is described with reference to FIG. 11. FIG. 11 is a flow chart illustrating an example of a data acquisition process according to the first embodiment.

The request response unit 21 receives a data acquisition request (step S10). In the data acquisition request, such an index condition as, for example, "Device=○○, Body=ΔΔ" is designated, and acquisition of device data that satisfies the index condition is requested.

Then, the index management unit 22 and the subdirectory management unit 23 search for the index condition described above (step S11). For example, the index management unit 22 searches for the index 30a of the index management table 30 to select an entry of the index 30a that satisfies the index condition described above. Meanwhile, the subdirectory management unit 23 searches for the index 32a of the first cache table 32 to select an entry of the index 32a that satisfies the index condition described above. Further, the subdirectory management unit 23 searches for the index 33a of the second cache table 33 to extract an entry of the index 33a that satisfies the index condition described above.

Then, the subdirectory management unit 23 decides whether or not there is an across-GW index search (step S12). If the subdirectory management unit 23 extracts an entry of the first cache table 32 or the second cache table 33, it decides that there is an across-GW index search, but in any other case, the subdirectory management unit 23 decides that there is no across-GW index search.

If it is decided that there is no across-GW index search, the data acquisition unit 25 acquires device data (raw data) from the raw data DB 6 managed by the sink 4 indicated by the sink address 30c of the entry extracted from the index management table 30 (step S13). The request response unit 21 sends back the acquired device data to the process from which the data acquisition request is issued (step S14), and then ends the present process.

If it is decided at step S12 that there is an across-GW index search, the subdirectory management unit 23 decides from which one of the first cache table 32 and the second cache table 33 the extracted entry has been extracted (step S15).

If the subdirectory management unit 23 decides that the extracted entry has been extracted from the first cache table 32, it updates the TTL 32e and the data acquisition request number Nreq 32c of the entry extracted from the first cache table 32 (step S16). Then, the data acquisition unit 25 acquires device data from the sink 4 indicated by the sink address 32d of the entry of the first cache table 32 (step S13). The request response unit 21 sends back the acquired device data to the process from which the data acquisition request has received (step S14), and then ends the present process.

If the subdirectory management unit 23 decides at step S15 that the extracted entry has been extracted from the second cache table 33, it updates the TTL 33c of the entry of the second cache table 33 (step S17).

Then, the subdirectory management unit 23 notifies the adjacent GWs 20' that the second cache table 33 is updated. The subdirectory management unit 23 of each of the adjacent GWs 20' increments the data acquisition request number Nreq 31c of the second cache management table 31 by one (step S20). At this time, updating of the data acquisition request number Nreq 31c is performed for each GW of the notification source.

Then, the subdirectory management unit 23 of the adjacent GW 20' decides whether or not $\alpha \text{Nput} - \beta \text{Nreq} \leq 0$ is satisfied (step S21), and notifies the GW 20 of the local side (notification source), to which the notification has been issued at step S17, of a result of the decision.

If a decision result that $\alpha \text{Nput} - \beta \text{Nreq} \leq 0$ is satisfied is received from the adjacent GW 20', the subdirectory management unit 23 of the GW 20 at the local side adds the entry extracted from the second cache table 33 to the first cache table 32 (step S18), whereafter the process advances to step S13. On the other hand, if a decision result that $\alpha \text{Nput} - \beta \text{Nreq} \leq 0$ is not satisfied is received, the subdirectory management unit 23 of the GW 20 at the local side advances directly to step S13.

At step S13, the data acquisition unit 25 accesses the GW 20 indicated by the index GW 33b of the entry extracted from the second cache table 33. Then, the data acquisition unit 25 acquires device data from the sink 4 indicated by the sink address 30c of the index management table 30 of the accessed GW 20 (step S13). The request response unit 21 sends back the device data (step S14) and then ends the present process.

[Data Registration Process]

Figure 12:
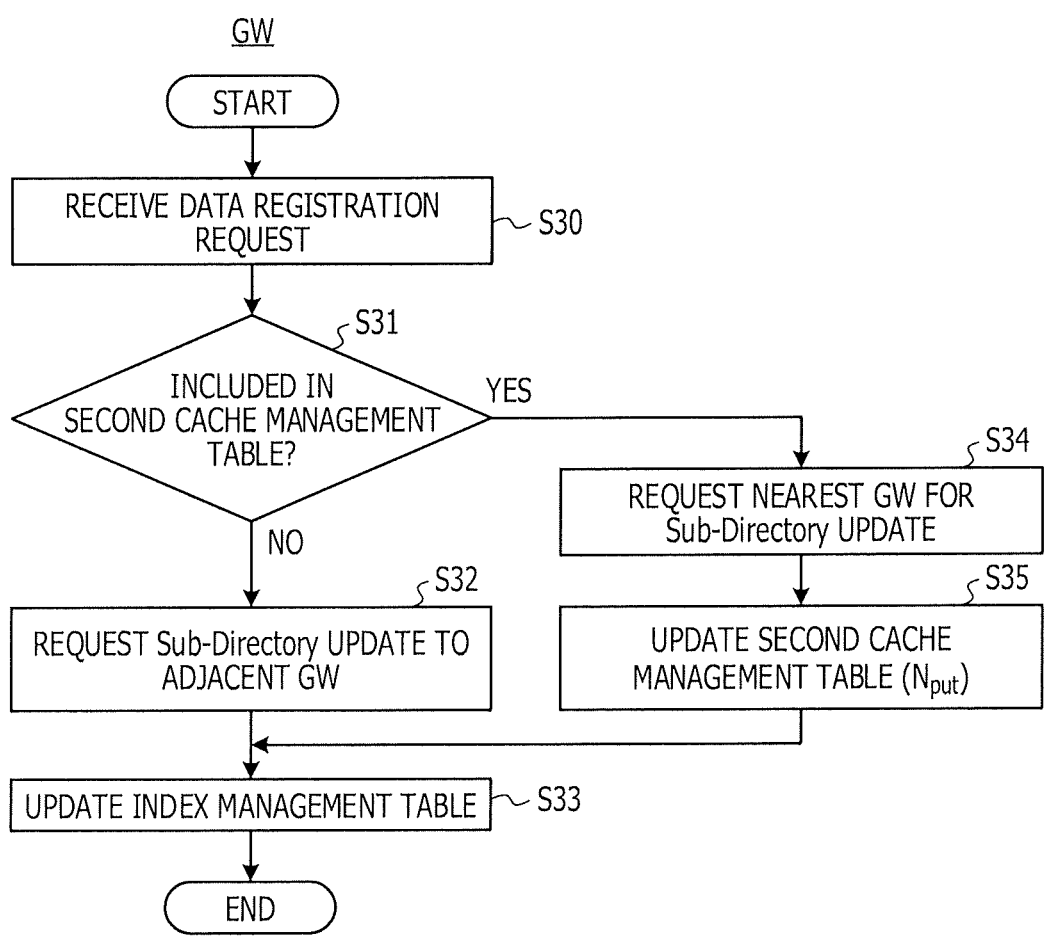
FIG. 12 is a flow chart illustrating an example of a data registration process according to the first embodiment.

Now, an example of the data registration process according to the first embodiment is described with reference to FIG. 12. FIG. 12 is a flow chart depicting an example of a data registration process according to the first embodiment. The request response unit 21 receives a data registration request (step S30).

Then, the subdirectory management unit 23 searches the second cache management table 31 to decide whether or not data of the registration request target is entered in the second cache management table 31 (step S31). Information that is not entered in the second cache management table 31 is index information that is not retained in the second cache table 33 in the adjacent GWs 20'. Therefore, if the subdirectory management unit 23 decides that the data of the registration request target is not entered in the second cache management table 31, it issues an update request for the subdirectory to the adjacent GWs 20' in order to enter the data of the registration request target into the first cache table 32 of the adjacent GWs 20' (step S32). Then, the index management unit 22 adds an entry to the index management table 30 in response to the data registration request (step S33) and then ends the present process.

On the other hand, if the subdirectory management unit 23 decides at step S31 that the data of the registration request target is entered in the second cache management table 31, since the data of the registration request target is index information retained in the second cache table 33 in the adjacent GWs 20', the subdirectory management unit 23 decides that the data of the registration request target may not be entered into the first cache table 32 of the adjacent GWs 20'. Therefore, as a result of the decision, the subdirectory management unit 23 does not issue an update request for the subdirectory to the adjacent GWs 20'. However, the subdirectory management unit 23 issues an update request for the subdirectory only to the nearest GW (step S34).

This is because, since, when the device 3 moves, the probability that the device 3 may move to the nearest GW is highest, by updating the first cache table 32 of the adjacent GWs 20' only when the device 3 moves to the nearest GW, when the device 3 moves to the nearest GW, the hit rate of index information in the first cache table 32 of the adjacent GWs 20' is raised to shorten the response time period. It is to be noted that the process performed by the adjacent GWs 20' in response to the subdirectory update request at step S32 and the process performed by the nearest GW in response to the subdirectory update request at step S34 are hereinafter described in the description of the subdirectory updating process of FIG. 13.

Referring back to FIG. 12, after the process at step S34, the subdirectory management unit 23 increments the data registration request number (Nput) 31*b* of the second cache management table 31 by one (step S35). Then, the index management unit 22 adds an entry to the index management table 30 in response to the data registration request (step S33) and then ends the present process.

[Subdirectory Updating Process]

Figure 13:
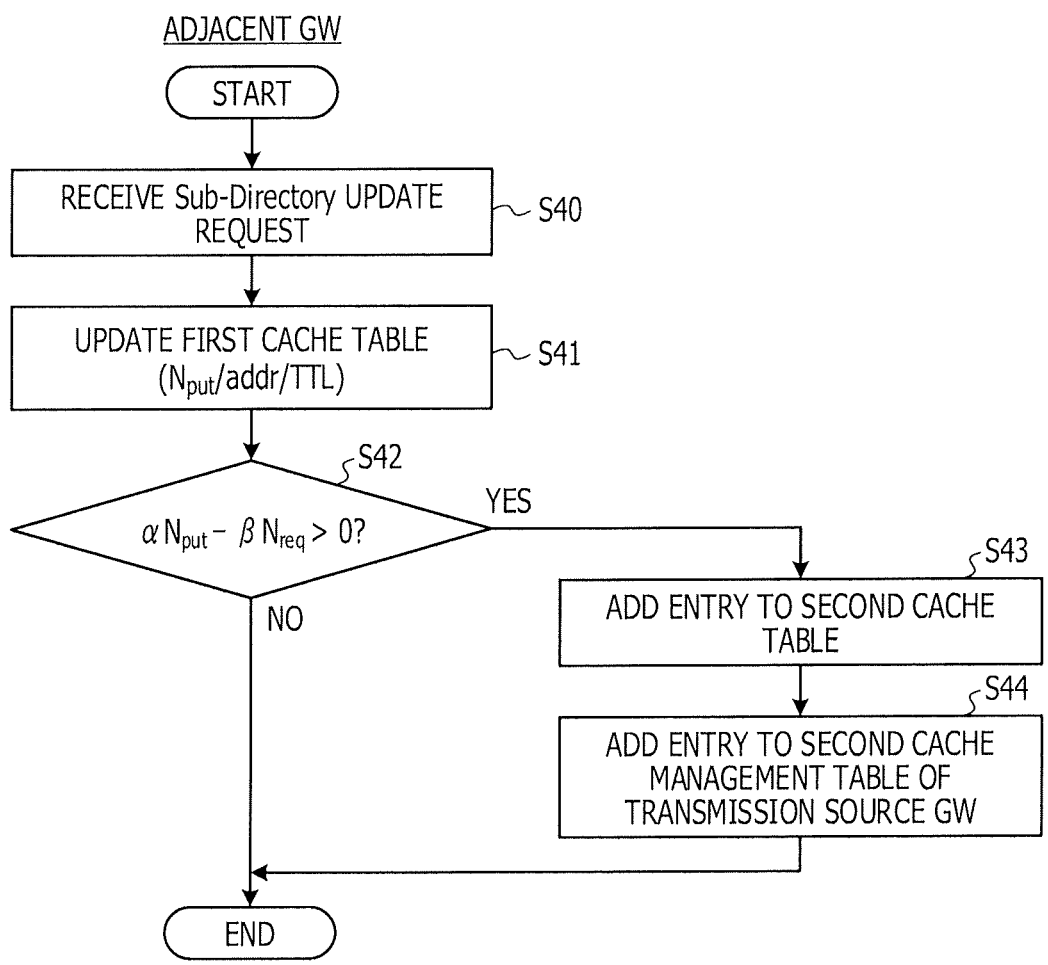
FIG. 13 is a flow chart illustrating an example of a subdirectory updating process according to the first embodiment.

Now, a subdirectory updating process of FIG. 13 is described. The subdirectory updating process of FIG. 13 is executed by each adjacent GW 20' that accepts the subdirectory update request transmitted from the GW 20 at step S32 of FIG. 12. Further, the subdirectory updating process of FIG. 13 is executed by the nearest GW by which the subdirectory update request transmitted from the GW 20 is accepted at step S34 of FIG. 12. In the following, description is given of a case in which the subdirectory updating process of FIG. 13 is executed by each adjacent GW 20' that accepts the subdirectory update request at step S32 while description of a case in which the subdirectory update request is executed by the nearest GW that accepts the subdirectory update request at step S34 is omitted because it executes the same process as that by the adjacent GWs 20'.

In the present process, the subdirectory update request is received by the adjacent GW 20' (step S40). The subdirectory management unit 23 of the adjacent GW 20' receiving the subdirectory update request increments the data registration request number (Nput) 32*b* corresponding to the index 32*a* of the first cache table 32 according to the data registration request by one. Further, the subdirectory management unit 23 of the adjacent GW 20' stores the sink address 32*d* that is a storage location of the data whose registration request is received and sets the TTL 32*e* (step S41).

Then, the subdirectory management unit 23 decides whether or not αNput−βNreq>0 is satisfied (step S42). If the subdirectory management unit 23 decides that αNput−βNreq>0 is satisfied, for example, when the data registration request frequency is higher that the data acquisition request frequency, the subdirectory management unit 23 adds an entry of the data in accordance with the registration request into the second cache table 33 (step S43). Then, the subdirectory management unit 23 causes the GW 20 of the transmission source, from which the subdirectory update request has been transmitted, to add the entry to the second cache management table 31 (step S44) and then ends the present process.

If it is decided at step S42 that αNput−βNreq>0 is not satisfied, the present process is ended immediately.

[Nearest GW Updating Process]

Now, an example of the nearest GW updating process according to one embodiment is described with reference to FIG. 14. FIG. 14 is a flow chart illustrating an example of a nearest GW updating process according to one embodiment.

After the nearest GW updating process is started, the subdirectory management unit 23 selects one of the indexes 31*a* from within the second cache management table 31 (step S51). Then, the subdirectory management unit 23 acquires the position at present of the device 3 and updates the nearest GW (step S52). Then, the subdirectory management unit 23 decides whether or not there remains a non-selected index 31*a*, and if it decides that there remains a non-selected index 31*a*, the process returns to step S51 so as to repeat the processes at the steps beginning with step S51. On the other hand, if it is decided at step S53 that there remains no non-selected index 31*a*, the present process is ended.

The distributed data management process according to the first embodiment is described above. According to the distributed data management process, if the data storage location may be specified by referring to the index management table 30, the data acquisition unit 25 performs acquisition of device data from the data storage location. On the other hand, if the data storage location may not be specified even if the index management table 30 is referred to, the subdirectory management unit 23 refers to the first cache table 32 and the second cache table 33 to specify the data storage location. As a result, the data acquisition unit 25 acquires device data according to the acquisition request from the specified data storage destination.

Further, at least which one of the first cache table 32 and the second cache table 33 is to be updated is decided in response to the data registration request from the device 3. In this case, the data acquisition request number Nreq and the data registration request number Nput are compared with each other to decide whether or not updating of the first cache table 32 is to be performed or updating of the second cache table 33 is to be performed, and the cache table is updated in response to a result of the decision.

At this time, the traffic volume between the GWs for the management of the first cache table 32 and the second cache table 33 performed by the subdirectory management unit 23 is defined by the following expression (1):

$$\text{Inter-GW traffic volume} = \text{inter-GW traffic volume upon data registration} + \text{inter-GW traffic volume upon data acquisition} \qquad (1)$$

where the inter-GW traffic volume upon data registration is equal to the update message amount of the first cache table 32. Meanwhile, the inter-GW traffic volume upon data acquisition is equal to the remote index search message amount, for example, to the message amount to be used upon index search for data to be acquired, which is performed by the adjacent GWs 20' and the GW 20.

For example, the expression (1) above is rewritten in the following manner:

$$\text{Inter-GW traffic volume} = \text{first cache table update message amount} + \text{remote index search message amount}$$

Further, the response time period upon data acquisition request is defined by the following expression (2):

$$\text{Average of response time period} = T\text{req} + xT\text{index} \qquad (2)$$

where Treq indicates an average of the response time period when the first cache table 32 is utilized, and Tindex indicates an incremental average of the response time period when the second cache table 33 is utilized. Further, x indicates a ratio of the request that utilizes the second cache table 33.

If it is assumed that data acquisition request varies in accordance with the Pareto's law, x=0.2 may be assumed, and it is considered that the increase of the average value of the response time period is not very great.

As the present embodiment described hereinabove, in the case where αNput−βNreq≤0, for example, where the data acquisition request frequency is equal to or higher than the data registration request frequency, the subdirectory management unit 23 updates the first cache table 32 upon registration of data. Further, upon data acquisition, the data acquisition unit 25 acquires device data directly from the storage location indicated by the sink address 32d stored in the first cache table 32.

On the other hand, in the case where αNput−βNreq>0, for example, where the data registration request frequency is higher than the data acquisition request frequency, the subdirectory management unit 23 updates the second cache table 33 upon registration of data. Further, upon data acquisition, the data acquisition unit 25 searches the GW 20 indicated by the index GW 33b stored in the second cache table 33 to acquire device data.

Figure 15:
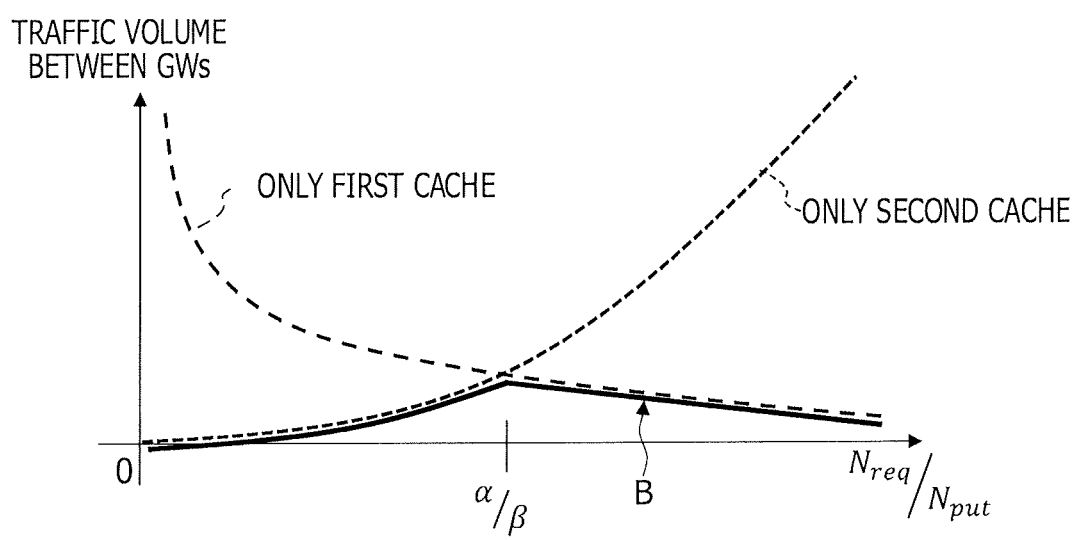
FIG. 15 is a view depicting an example of an effect of a distributed data management process according to one embodiment.

Consequently, as indicated by a line B of FIG. 15, in comparison with an alternative case in which the GW 20 includes only the first cache table 32 or the second cache table 33, increase of the traffic volume occurring between GWs 20 for subdirectory management may be suppressed. As a result, the response time period for a data acquisition request may be reduced.

Second Embodiment

Now, a distributed data management process according to a second embodiment is described. While, in the first embodiment, the storage area for information to be used for subdirectory management has a two-data structure of the first cache table 32 and the second cache table 33, in the second embodiment, the storage area for information to be used for subdirectory management has a three-data structure of a first cache table 32, a second cache table 33, and a third cache table 34.

The first cache table 32 updates the sink address at which device data of the acquisition request target is retained. The second cache table 33 updates the address of the GW that retains index information of device data of the acquisition request target. The third cache table 34 updates only once when the first cache table 32 is updated by n times. n is an integer equal to or greater than 2.

If it is assumed that $T_1<0<T_2$ is satisfied, in the present embodiment, when $\gamma Nput-\delta Nreq \leq T_1$ is satisfied, the first cache table 32 is updated. When $T_1<\gamma Nput-\delta Nreq \leq T_2$ is satisfied, the third cache table 34 is updated. When $T_2<\gamma Nput-\delta Nreq$ is satisfied, the second cache table 33 is updated.

Consequently, the first cache table 32 has the most detailed data; the third cache table 34 has the second most detailed data; and the second cache table 33 has the roughest data.

It is to be noted that γ and δ are weighting values for normalizing the data registration request number Nput and the data acquisition request number Nreq for comparison between them and have values according to message sizes upon data acquisition and upon data registration.

(Index Management Table)

Figure 16:
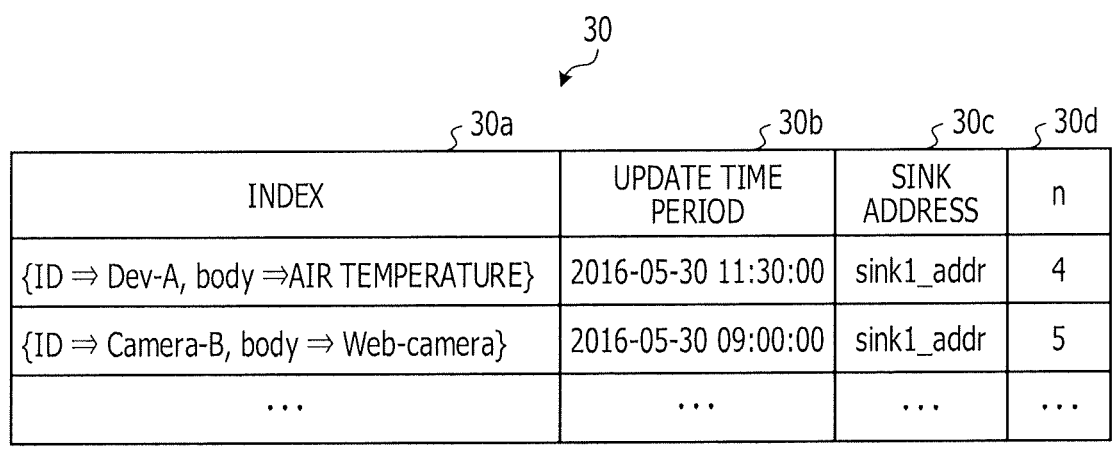
FIG. 16 is a view depicting an example of an index management table according to a second embodiment.

FIG. 16 is a view depicting an example of an index management table according to the second embodiment. The index management table illustrated in FIG. 16 may be the index management table 30 illustrated in FIG. 3. The index management table 30 stores an index 30a, an update time period 30b, a sink address 30c, and a counter n 30d. The counter n 30d counts the registration time number into the first cache table 32.

The configuration of the second cache management table 31, the first cache table 32, and the second cache table 33 is same as the configuration of the respective tables illustrated in FIGS. 6 to 8.

(Third Cache Table)

FIG. 17 depicts an example of a third cache table according to the second embodiment. The configuration of a third cache table 34 illustrated in FIG. 17 is same as the configuration of the first cache table 32. In the present embodiment, the third cache table 34 is updated only once when the first cache table 32 is updated by n times with the substance same as that of the entry of the first cache table 32.

The third cache table 34 is an example of a third storage unit that stores index information to information of an apparatus and storage location information of the information of the apparatus in a lower frequency than that of the first cache table 32.

[Distributed Data Management Process]

Now, an example of the distributed data management process according to the second embodiment is described. Since the distributed data management process according to the second embodiment is same as the distributed data management process according to the embodiment described hereinabove with reference to FIG. 10, description of the same is omitted herein.

Figure 18A:
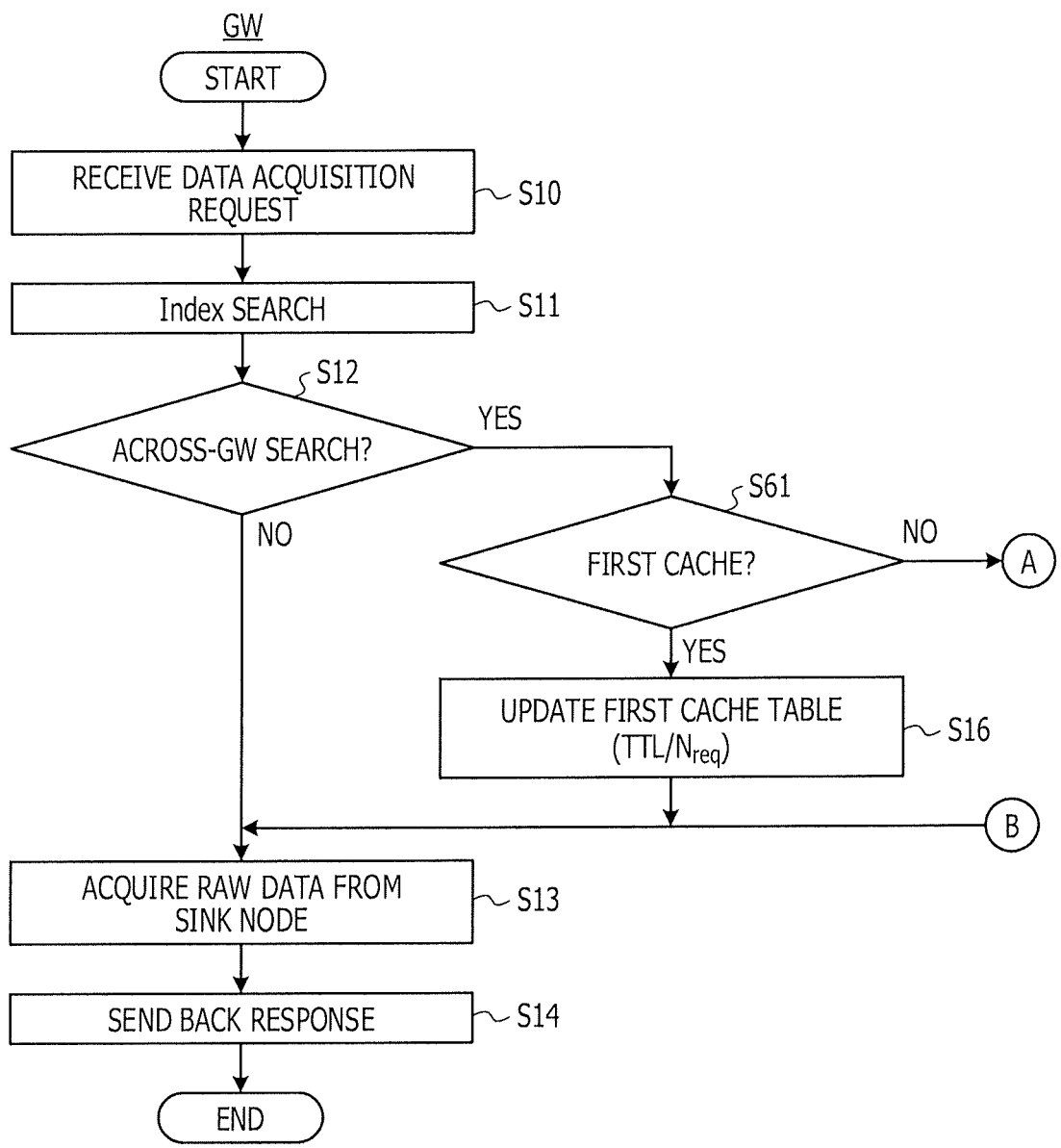
FIGS. 18A and 18B are a flow chart illustrating an example of a data acquisition process according to the second embodiment.
Figure 18B:
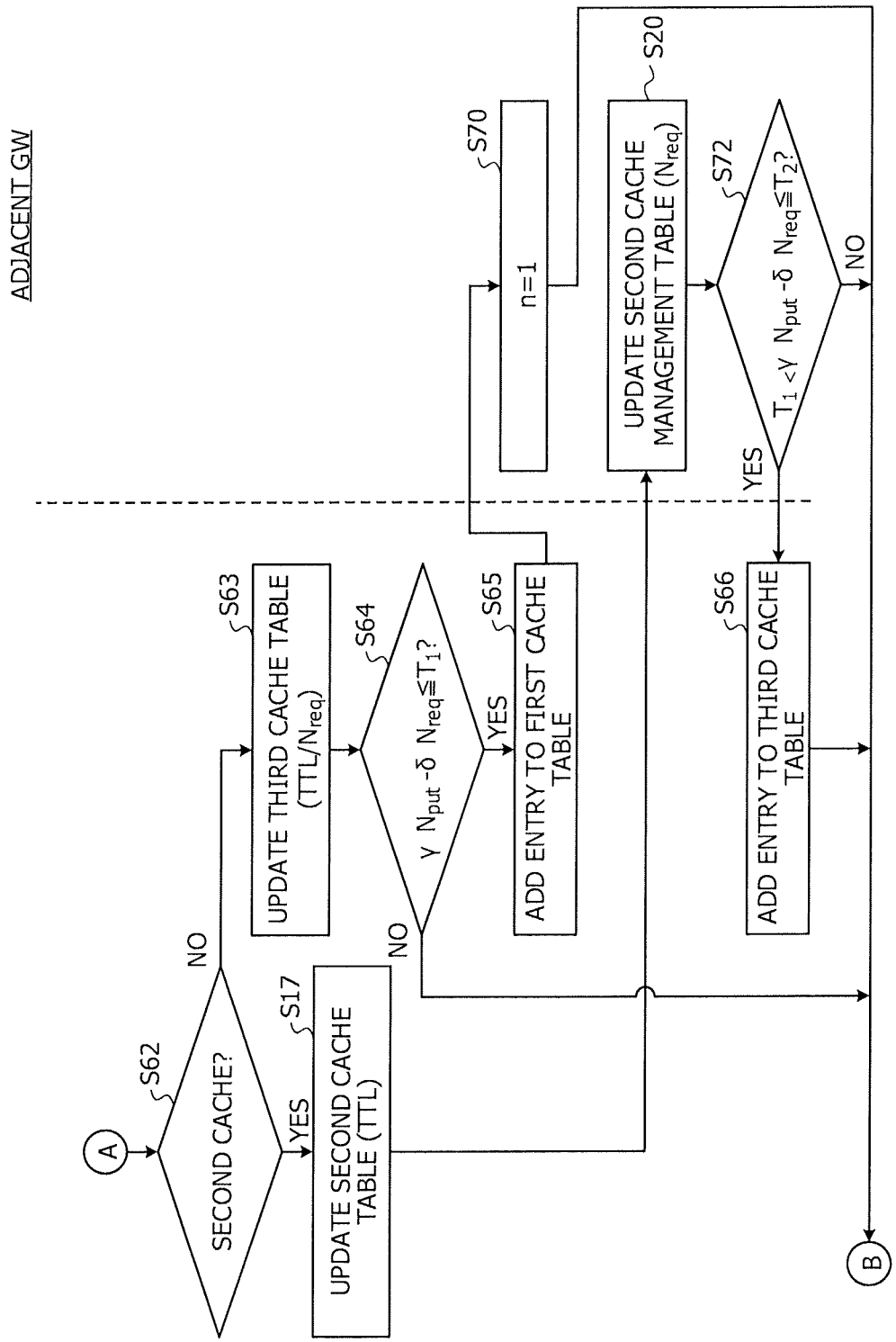
Figure 19:
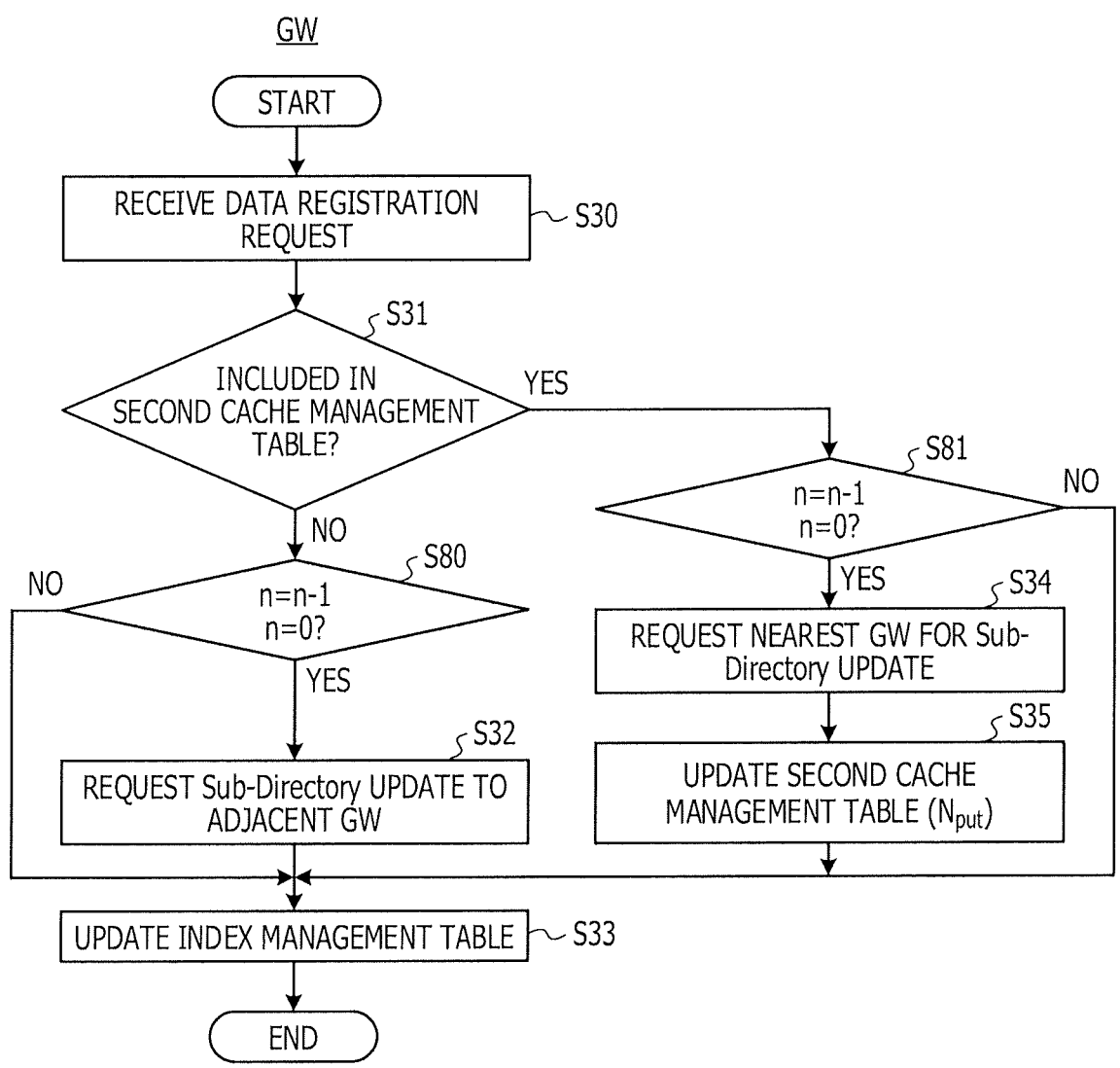
FIG. 19 is a flow chart illustrating an example of a data registration process according to the second embodiment.
Figure 20:
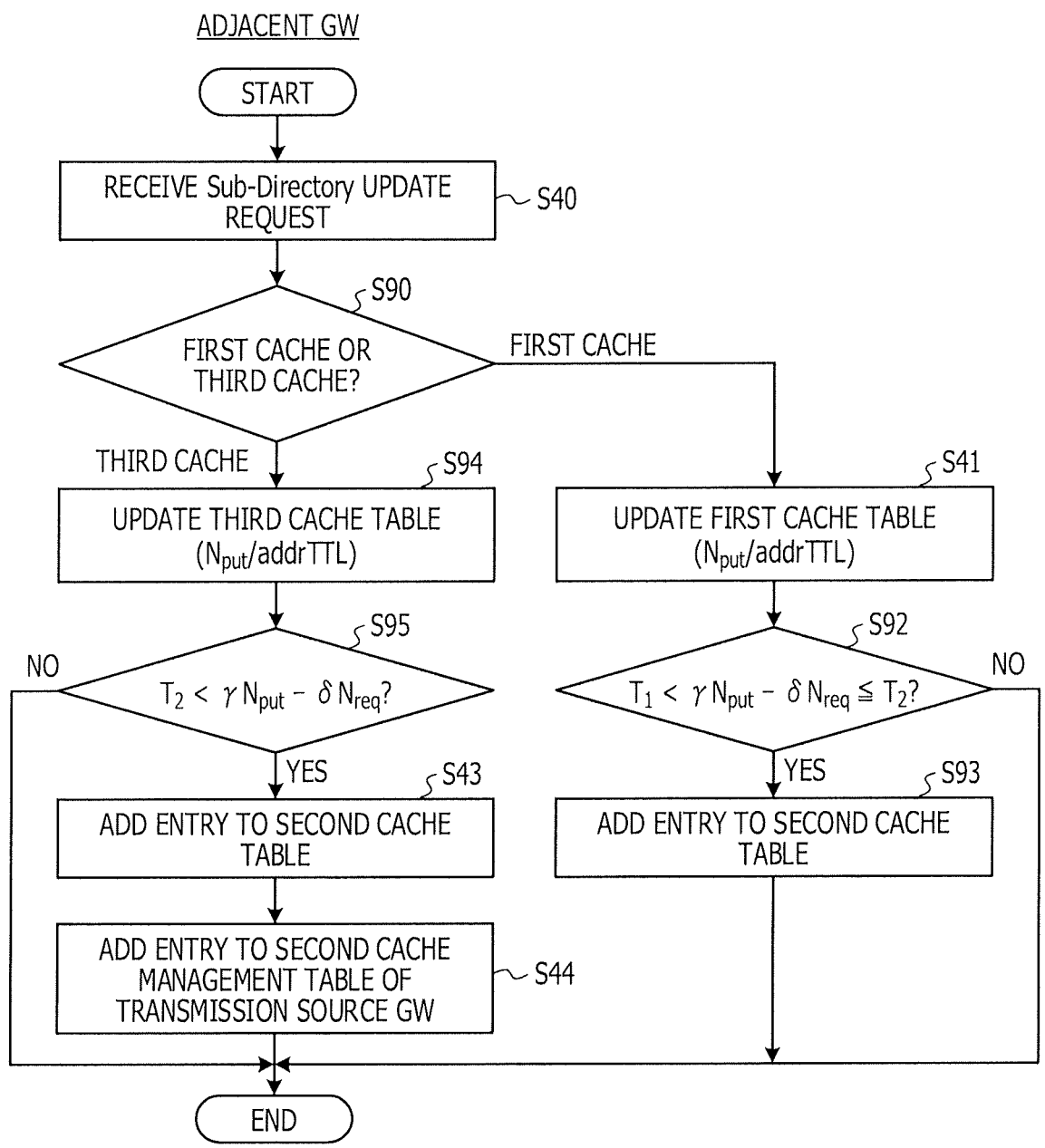
FIG. 20 is a flow chart illustrating an example of a subdirectory updating process according to the second embodiment.

In the present embodiment, a data acquisition process according to the second embodiment depicted in FIGS. 18A and 18B are executed in place of the data acquisition process (FIG. 11) executed at step S2 of FIG. 10. Further, in place of the data registration process (FIG. 12) executed at step S4 of FIG. 10, a data registration process according to the second embodiment depicted in FIG. 19 is executed. Furthermore, in place of the subdirectory updating process (FIG. 13) executed at step S6 of FIG. 10, a subdirectory updating process according the second embodiment depicted in FIG. 20 is executed. It is to be noted that, since the updating process of the nearest GW according to the second embodiment is same as the updating process (FIG. 14) of the nearest GW executed at step S8 of FIG. 10, description of the same is omitted herein.

[Data Acquisition Process]

An example of a data acquisition process according to the second embodiment is described with reference to FIGS. 18A and 18B. The same processing steps (S10 to S14, S16, S17, and S20) to those of the data acquisition process according to the first embodiment are denoted by the same step numbers, and description of them is simplified.

After a data acquisition request is received (step S10), extraction of the entry by index search (step S11) and decision of whether or not the index search is an across-GW index search (step S12) are performed. If it is decided that the index search is not an across-GW index search, the data acquisition unit 25 acquires device data from the raw data DB 6 managed by the sink 4 indicated by the sink address 30c of the index management table 30 (step S13). The request response unit 21 sends back the acquired device data (step S14) and then ends the present process.

If it is decided at step S12 that the index search is an across-GW index search, the subdirectory management unit 23 decides whether or not the target is the first cache table 32 (step S61). If it is decided that the target is the first cache table 32, the subdirectory management unit 23 updates the corresponding TTL 32e and data acquisition request number (Nreq) 32c of the first cache table 32 (step S16). Then, the data acquisition unit 25 acquires device data from the sink node of the first cache table 32 (step S13), and the request response unit 21 sends back the acquired device data (step S14) and then ends the present process.

If it is decided at step S61 that the target is not the first cache table 32, the subdirectory management unit 23 decides that the target is the second cache table 33 (step S62). If the subdirectory management unit 23 decides that the target is the second cache table 33, it updates the corresponding TTL 33c of the second cache table 33 (step S17).

Then, the subdirectory management unit 23 of the adjacent GW 20' that receives the notification from the GW 20 increments the data acquisition request number (Nreq) 31c of the second cache management table 31 by one (step S20). Then, the subdirectory management unit 23 of the adjacent GW 20' decides whether or not $T_1 < \gamma Nput - \delta Nreq \leq T_2$ is satisfied (step S72) and notifies the GW 20 of the local side of a result of the decision.

When the subdirectory management unit 23 of the GW 20 of the local side receives a result of the decision that $T_1 < \gamma Nput - \delta Nreq \leq T_2$ is satisfied from the adjacent GW 20', it adds the entry extracted from the second cache table 33 to the third cache table 34 (step S66), whereafter the process advances to step S13. On the other hand, when the subdirectory management unit 23 of the GW 20 at the local side receives a result of the decision that $T_1 < \gamma Nput - \delta Nreq \leq T_2$ is not satisfied from the adjacent GW 20', the process immediately advances to step S13.

At step S13, the data acquisition unit 25 accesses the GW 20 indicated by the index GW 33b to the entry of the second cache table 33. Then, the data acquisition unit 25 acquires device data from the sink 4 indicated by the sink address 30c of the index management table 30 of the accessed GW 20 (step S13). The request response unit 21 sends back the acquired device data (step S14) and then ends the present process.

If the subdirectory management unit 23 decides at step S62 that the target is not the second cache table 33, it updates the corresponding TTL 34e and data acquisition request number (Nreq) 34c of the third cache table 34 (step S63). Then, the subdirectory management unit 23 decides whether or not $\gamma Nput - \delta Nreq \leq T_1$ is satisfied (step S64). If the subdirectory management unit 23 decides that $\gamma Nput - \delta Nreq \leq T_1$ is satisfied, the subdirectory management unit 23 adds the entry of the first cache table 32 (step S65) and notifies the adjacent GW 20' of this. The subdirectory management unit 23 of the adjacent GW 20' receiving this notification sets 1 to the counter n. The data acquisition unit 25 of the local side acquires the device data from the sink node (step S13), and the request response unit 21 sends back the acquired device data (step S14) and then ends the present process.

If the subdirectory management unit 23 decides at step S64 that $\gamma Nput - \delta Nreq \leq T_1$ is not satisfied, it acquires device data from the sink node (step S13) and sends back the acquired device data (step S14) and then ends the present process.

[Data Registration Process]

Now, an example of a data registration process according to the second embodiment is described with reference to FIG. 19. It is to be noted that the same processing steps (S30 to S35) to those of the data registration process according to the first embodiment depicted in FIG. 12 are denoted by the same step numbers and description of them is simplified herein.

If a data registration request is received (step S30), a search regarding whether or not an entry according to the data registration request is included in the second cache management table 31 (step S31) is performed. If it is decided that such an entry is included in the second cache management table 31, the subdirectory management unit 23 decrements the counter n by one and decides whether or not the counter n is equal to 0 (step S81). If it is decided that the counter n is not 0, the subdirectory management unit 23 updates the index management table 30 (step S33) and then ends the present process.

If it is decided at step S81 that the counter n is 0, the subdirectory management unit 23 issues an update request for the subdirectory to the nearest GW (step S34) and updates the data registration request number (Nput) 31b of the second cache management table 31 (step S35). Then, the subdirectory management unit 23 updates the index management table 30 (step S33), thereby ending the present process.

If it is decided at step S31 that such an entry as described above is included in the second cache management table 31, the subdirectory management unit 23 decrements the counter n by one and decides whether or not the counter n is 0 (step S80). If it is decided that the counter n is not 0, the subdirectory management unit 23 updates the index management table 30 (step S33) and then ends the present process.

If it is decided at step S80 that the counter n is 0, the subdirectory management unit 23 issues an update request for the subdirectory to the adjacent GW 20' (step S32) and updates the index management table 30 (step S33) and then ends the present process.

[Subdirectory Updating Process]

Now, an example of a subdirectory updating process according to the second embodiment is described with reference to FIG. 20. It is to be noted that the same processing steps (S40, S41, S43, and S44) to those of the subdirectory updating process according to the first embodiment depicted in FIG. 13 are denoted by the same step numbers and description of them is simplified herein.

If a subdirectory update request is received by an adjacent GW 20' (step S40), the subdirectory management unit 23 of the adjacent GW 20' decides for which one of the first cache table 32 and the third cache table 34 the update request is (step S90). If it is decided that the update request is for the first cache table 32, the subdirectory management unit 23 of the adjacent GW 20' updates the corresponding data registration request number (Nput) 32b, sink address 32d, and TTL 32e of the first cache table 32 (step S41), whereafter the process advances to step S92.

If it is decided at step S90 that the subdirectory update request is for the third cache table 34, the subdirectory management unit 23 of the adjacent GW 20' updates the corresponding data registration request number (N put) 34b, sink address 34d, and TTL 34e of the third cache table 34 (step S94), whereafter the process advances to step S95.

At step S92, it is decided whether or not $T_1 < \gamma Nput - \delta Nreq \leq T_2$ is satisfied, and if it is not satisfied, the present process is ended. If $T_1 < \gamma Nput - \delta Nreq \leq T_2$ is satisfied, the subdirectory management unit 23 of the adjacent GW 20' adds an entry according to the data registration request to the second cache table 33 (step S93) and then ends the present process.

At step S95, it is decided whether or not $T_2 < \gamma Nput - \delta Nreq$ is satisfied, and if it is not satisfied, the present process is ended. If $T_2 < \gamma Nput - \delta Nreq$ is satisfied, the subdirectory management unit 23 of the adjacent GW 20' adds an entry according to the data registration request to the second cache table 33 (step S43). Then, the subdirectory management unit 23 of the adjacent GW 20' causes the second cache management table 31 of the GW 20 of the transmission source, from which the subdirectory update request has been transmitted, to add an entry according to the data registration request (step S44) and then ends the present process.

As described above, according to the second embodiment, a three-data structure is applied in which the first cache table 32 has the most detailed data; the third cache table 34 has the second most detailed data; and the second cache table 33 has the roughest data. Consequently, when the data registration request frequency is highest, the first cache table 32 is updated, and when the data registration request frequency drops, the third cache table 34 is updated, and when the data acquisition request frequency is higher than the data registration request frequency, the second cache table 33 is updated. Consequently, such control as to reduce the traffic volume and reduce the response time period further than those in the first embodiment.

The distributed data management processes according to the embodiments have been described hereinabove. According to the distributed data management processes, a data acquisition request may be coped with rapidly with a restricted storage capacity. It is to be noted that, in the description given above, to a deployed process, desired device data is sent back from the GW 20. However, the embodiments are not limited to this, and the GW 20 may transmit a storage location (sink address) for device data to a deployed process such that the process itself may access the storage location of the device data to acquire the device data of the acquisition request target.

[Hardware Configuration]

Figure 21:
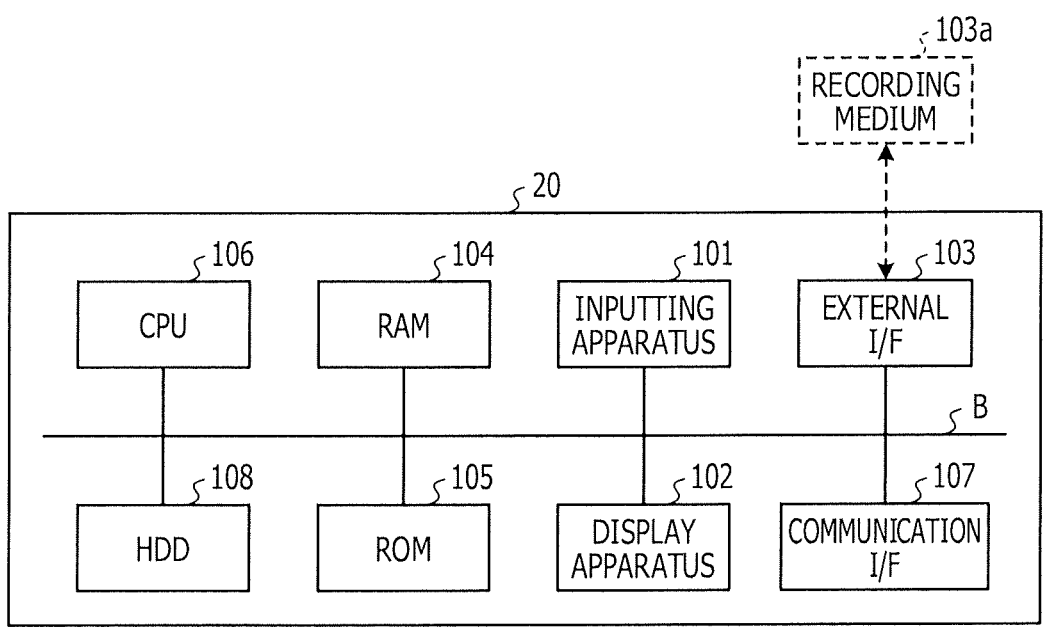
FIG. 21 is a view depicting an example of a hardware configuration of a GW according to one embodiment.

Finally, a hardware configuration of the GW 20 according to the present embodiment is described with reference to FIG. 21. FIG. 21 depicts an example of a hardware configuration of the GW 20 according to the present embodiment. The GW 20 includes an inputting apparatus 101, a display apparatus 102, an external interface (I/F) 103, a random access memory (RAM) 104, a read only memory (ROM) 105, a central processing unit (CPU) 106, a communication I/F 107, a hard disk drive (HDD) 108 and so forth, which are coupled to each other by a bus B.

The inputting apparatus 101 includes a keyboard, a mouse and so forth and is used to input various operation signals to the GW 20. The display apparatus 102 includes a display unit or the like and displays various processing results. The communication I/F 107 is an interface for coupling the GW 20 to a network. Consequently, the GW 20 may perform data communication with a different apparatus (adjacent GW 20', sink 4, device 3 or the like) through the communication I/F 107.

The HDD 108 is a nonvolatile storage apparatus that stores programs and data therein. The programs and data stored include basic software and application software for controlling the entire GW 20. For example, in the HDD 108, various databases, programs and so forth may be stored.

The external I/F 103 is an interface with an external apparatus. The external apparatus may be a recording medium 103a or the like. Consequently, the GW 20 may perform reading and/or writing into and/or from the recording medium 103a through the external I/F 103. As the recording medium 103a, there are a compact disk (CD), a digital versatile disk (DVD), a secure digital (SD) memory card, a universal serial bus (USB) memory and so forth.

The ROM 105 is a nonvolatile semiconductor memory that may retain internal data even if the power supply thereto is turned off. In the ROM 105, programs and data for network setting and so forth are stored. The RAM 104 is a volatile semiconductor memory that temporarily retains programs and data. The CPU 106 is an arithmetic operation unit that reads out a program or data from a storage apparatus such as the HDD 108 or the ROM 105 into the RAM 104 and executes process to implement control of the entire apparatus and functions included in the apparatus.

By such a configuration as described above, in the GW 20 according to the present embodiment, the CPU 106 executes the distributed data management process, the data acquisition process, the data registration process, the subdirectory updating process, and the nearest GW updating process, for example, using the programs and data stored in the RAM 104, the ROM 105, and the HDD 108. It is to be noted that the subdirectory updating process is executed when the GW 20 functions as an adjacent GW 20'.

The function of the storage unit 24 is implemented, for example, by the RAM 104, the ROM 105, and the HDD 108. Meanwhile, the functions of the request response unit 21, the data acquisition unit 25, and the index reception unit 26 are implemented, for example, by the communication I/F 107. Further, the functions of the request response unit 21, the index management unit 22, the subdirectory management unit 23, the data acquisition unit 25, and the process execution unit 27 are implemented, for example, by the CPU 106. For example, the distributed data management process, the data acquisition process, the data registration process, the subdirectory updating process, and the nearest GW updating process are implemented by processes the distributed data management program causes the CPU 106 to execute.

The distributed data management apparatus, the distributed data management program, and the distributed data management method are not limited to the embodiments described above and may be modified or improved in various manners without departing from the subject matter of the present technology. Further, when there are plural embodiments described above and modifications, they may be combined with each other within a range within which they remain consistent.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A distributed data management apparatus comprising:
    a memory including a first memory region and a second memory region; and
    a processor coupled to the memory, and the processor configured to execute a process, the process including:
        counting a first number of times by which an acquisition request of data managed by different apparatus from the distributed data management apparatus is issued;
        counting a second number of times by which a registration request of data managed by different apparatus from the distributed data management apparatus is issued;
        receiving the acquisition request of data managed by different apparatus from the distributed data management apparatus;

when the first number is more than the second number, storing an address of the storage storing the acquisition requested data into the first memory region; and when the second number is more than the first number, storing an identifier indicating the different apparatus managing the acquisition requested data into the second memory region without storing the address of the storage storing the acquisition requested data into the second memory region.

2. The distributed data management apparatus according to claim 1, the process further including transmitting the first number to the different apparatus.

3. The distributed data management apparatus according to claim 1, the process further including:

receiving counting information including the first number and the second number counted by the different apparatus, wherein the counting of the first number and the second number is based on the counting information.

4. The distributed data management apparatus according to claim 1, the process further including:

receiving the registration request of data managed by different apparatus from the distributed data management apparatus;

transmitting registration information indicating the registration requested data when the identifier indicating the different apparatus managing the registration requested data is not stored into the second memory region.

5. A non-transitory computer-readable storage medium storing a program that causes a distributed data management apparatus to execute a process, the process comprising:

counting a first number of times by which an acquisition request of data managed by different apparatus from the distributed data management apparatus is issued;

counting a second number of times by which a registration request of data managed by different apparatus from the distributed data management apparatus is issued;

receiving the acquisition request of data managed by different apparatus from the distributed data management apparatus;

when the first number is more than the second number, storing an address of the storage storing the acquisition requested data into a first memory region; and when the second number is more than the first number, storing an identifier indicating the different apparatus managing the acquisition requested data into the second memory region without storing the address of the storage storing the acquisition requested data into a second memory region.

6. A distributed data management method executed by a distributed data management apparatus, the distributed data management method comprising:

counting a first number of times by which an acquisition request of data managed by different apparatus from the distributed data management apparatus is issued;

counting a second number of times by which a registration request of data managed by different apparatus from the distributed data management apparatus is issued;

receiving the acquisition request of data managed by different apparatus from the distributed data management apparatus;

when the first number is more than the second number, storing an address of the storage storing the acquisition requested data into a first memory region; and when the second number is more than the first number, storing an identifier indicating the different apparatus managing the acquisition requested data into the second memory region without storing the address of the storage storing the acquisition requested data into a second memory region.

* * * * *